United States Patent
Pretzlaff et al.

(10) Patent No.: US 12,462,984 B2
(45) Date of Patent: Nov. 4, 2025

(54) ELECTROLYTIC CAPACITOR COMPONENTS AND MANUFACTURING METHODS

(71) Applicant: KEMET Electronics Portugal, S.A., Évora (PT)

(72) Inventors: Bernd Pretzlaff, Mildstedt (DE); Janosch Lichtenberger, Bremen (DE); Helge Pretzlaff, Schlotfeld (DE); Andreas Fahr, Koldenbuettel (DE)

(73) Assignee: KEMET Electronics Portugal, S. A., Évora (PT)

( * ) Notice: Subject to any disclaimer, the term of this patent is extended or adjusted under 35 U.S.C. 154(b) by 258 days.

(21) Appl. No.: 18/250,163

(22) PCT Filed: Oct. 27, 2021

(86) PCT No.: PCT/EP2021/079796
§ 371 (c)(1),
(2) Date: Apr. 21, 2023

(87) PCT Pub. No.: WO2022/090300
PCT Pub. Date: May 5, 2022

(65) Prior Publication Data
US 2023/0402232 A1    Dec. 14, 2023

(30) Foreign Application Priority Data
Oct. 30, 2020    (EP) .................................... 20204895

(51) Int. Cl.
*H01G 9/00*        (2006.01)
*G01N 27/04*       (2006.01)
(Continued)

(52) U.S. Cl.
CPC ......... *H01G 9/0029* (2013.01); *G01N 27/041* (2013.01); *H01G 9/045* (2013.01); *H01G 9/055* (2013.01); *H01G 13/00* (2013.01)

(58) Field of Classification Search
CPC ...... H01G 9/0029; H01G 9/045; H01G 9/055; H01G 13/00; H01G 9/10; H01G 9/14;
(Continued)

(56) References Cited

U.S. PATENT DOCUMENTS 2,182,376 A    12/1939   Gray
5,697,761 A    12/1997   Morgan et al.
(Continued)

FOREIGN PATENT DOCUMENTS

EP    1294442 A2       3/2003
JP    2009206046 A     9/2009
(Continued)

OTHER PUBLICATIONS

European Search Report mailed on Jul. 9, 2021, by the European Patent Office for Application No. 20204895.5. (16 pages).
(Continued)

*Primary Examiner* — Scott B Geyer
(74) *Attorney, Agent, or Firm* — Joseph T. Guy; Patent Filing Specialist Inc.

(57) ABSTRACT

The invention relates to methods for manufacturing an energy storage of an electrolytic capacitor, to a method for manufacturing a foil electrode of an aluminum electrolytic capacitor, to a device for manipulating a component of an aluminum electrolytic capacitor, to specifically designed foil electrodes for an aluminum electrolytic capacitor, to a method and a device for analyzing a quality of a section of paper to be used as separator of an electrolytic capacitor, and to a specifically designed electrolytic capacitor.

2 Claims, 20 Drawing Sheets

(51) Int. Cl.
*H01G 9/045* (2006.01)
*H01G 9/055* (2006.01)
*H01G 13/00* (2013.01)

(58) Field of Classification Search
CPC ............ H01G 9/08; H01G 9/22; H01G 9/012; H01G 9/0032; H01G 9/008; H01G 9/26
See application file for complete search history.

(56) References Cited

U.S. PATENT DOCUMENTS

| | | | |
|---|---|---|---|
| 2002/0034062 A1 | 3/2002 | Ophelan et al. | |
| 2003/0077506 A1* | 4/2003 | Michel | H01G 9/02 |
| | | | 429/176 |
| 2006/0023396 A1 | 2/2006 | Sherwood | |
| 2006/0107506 A1 | 5/2006 | Doffing et al. | |
| 2010/0132308 A1* | 6/2010 | Kadowaki | B65H 39/14 |
| | | | 414/789.5 |
| 2010/0139866 A1 | 6/2010 | Kirita et al. | |
| 2015/0372340 A1* | 12/2015 | Taylor | B65H 18/28 |
| | | | 429/131 |
| 2016/0276701 A1* | 9/2016 | Sale | H01M 10/0404 |

FOREIGN PATENT DOCUMENTS

| | | |
|---|---|---|
| JP | 3154932 U | 10/2009 |
| JP | 2012018776 A | 1/2012 |
| RU | 2432634 C1 | 10/2011 |

OTHER PUBLICATIONS

International Search Report (PCT/ISA/210) and Written Opinion (PCT/ISA/237) mailed on Jan. 18, 2022, by the European Patent Office as the International Searching Authority for International Application No. PCT/EP2021/079796. (22 pages).

Partial European Search Report mailed on May 7, 2021, by the European Patent Office for Application No. 20204895.5. (14 pages).

* cited by examiner

ELECTROLYTIC CAPACITOR COMPONENTS AND MANUFACTURING METHODS

CROSS-REFERENCE TO RELATED APPLICATIONS

This application is the United States National Phase under 35 U.S.C. § 371 of PCT International Patent Application No. PCT/EP2021/079796, filed on Oct. 27, 2021, which claims the benefit of European Patent Application No. 20204895.5, filed on Oct. 30, 2020, the disclosures of which are hereby incorporated by reference herein in their entireties.

TECHNICAL FIELD

The present invention relates to methods for manufacturing an energy storage of an electrolytic capacitor methods for manufacturing a film electrode of an aluminum electrolytic capacitor to a device for manipulating a component of an aluminum electrolytic capacitor to a foil electrode for an aluminum electrolytic capacitor to a method for analyzing the quality of a section of paper to be used as separator of an electrolytic capacitor to a device for analyzing the quality of a section of paper to be used as separator of an electrolytic capacitor and to an electrolytic capacitor

BACKGROUND

Therapeutic electrolytic capacitors may be constructed by stacking up cathodes, separators and anodes (the so-called components of an electrolytic capacitor). The separators serve as insulation between the cathodes and anodes and thus prevent an internal short circuit.

In order to achieve an optimal energy density, stacked components for energy storage must be placed on top of each other as precisely as possible. On the one hand, this avoids dead volume and on the other hand, precise stacking ensures that safety-relevant distances between the components are maintained. In addition, an optimal overlap between the anodes and the cathodes can be achieved.

Since the energy storage devices also contribute to a large proportion of the device volume of an implantable cardioverter defibrillator (ICD), the volume of an ICD can be reduced to the benefit of the patient.

The stacking and alignment of components can be done using various methods. From the prior art it is known to guide the components with corresponding recesses over pins or columns to align the components at contact edges.

However, stacking over pins can damage the components. In addition, the positioning accuracy is not as high, since there must always be a gap between the pin and the component to guide them. The gaps for the pins in the components also reduce the active component area and thus the energy density of the energy storage device.

Alignment via contact edges can also damage the components. In addition, alignment is difficult for very thin, flexible components because the component edges are not stable and therefore do not allow precise alignment.

A well-known optical recognition for the alignment of components takes place via edge detection. Thereby the edges of a component are optically detected. By means of a reference axis system of a detection system the detected edges are interpreted in relation to the position of the component.

In general, the accuracy of the edge detection improves with an enlargement of the detection system. Often, however, a compromise must be made between the edge detection accuracy and the detected field of view.

If the magnification is too high, only a small edge length remains in the field of view of the optical detection system. If the component edges are not cleanly manufactured, they show burrs or fraying. These lead to errors in position determination.

If the magnification is too small, the edge determination is limited by the resolution of the optical system.

To determine the position and rotation of flat components, at least two edges must be detected, preferably in a component corner. Arcuate edges of the components are a special difficulty, since due to the symmetries of such edges often only an inaccurate optical position determination is possible.

A further problem is caused by the fixing of the components during the position determination. Here, grippers or hold-down devices are often unavoidable, which at least partially cover the edges of the components that are ideal for position determination.

When stacking components with different optical properties in a complex machine environment with grippers and holding-down devices, position determination via component edges is therefore usually subject to greater inaccuracies. Therefore, the tolerances of the components and the safety distances between the components must be designed larger.

Especially with aluminum electrolytic capacitors, foil cathodes are electrically and mechanically separated from the foil anodes by thin separators. To achieve high efficiency—i.e., high energy density—cathodes and separators must be designed as thin as possible. To achieve this, the cathodes are typically punched from a foil. However, this process regularly leaves behind punching burrs.

To ensure reliable contacting of individual cathodes, they must be welded. Welding high-capacity and therefore coated cathodes is difficult. This is because the coating leads to poor melting and deflagration. Consequently, only an unreliable welding connection can be realized.

Therefore, typically an uncoated cathode foil is used to produce cathodes. In order to provide several cathodes with a common connection, the individual cathodes are wrapped with a wire according to a solution known from prior art. The wire and the individual cathodes are then welded together.

In another solution known from prior art, the individual cathodes are clamped with metal sheets and then welded together with the metal sheets. Then a common contact between a housing and a cover is welded-in during cover welding.

In aluminum electrolytic capacitors, the separator between the anodes and cathodes often consists of thin paper a few micrometers thick. However, metallic particles can be produced during the manufacture of the paper separator and become pushed into or embedded within the paper.

The number of conductive or ferrous particles is specified for capacitor paper in the procurement documents including test procedures. These particles can lead to internal short circuits of the capacitor. Since these can occur throughout the life of the capacitor, they can have fatal consequences for a patient if the capacitor paper is used to make an electrolytic capacitor for a cardiac stimulation device.

Consequently, only paper without electrically conductive particles may be used for such capacitors. However, it is not easy to determine whether the paper contains such conductive particles.

Summarizing, there exist many problems with respect to energy storages of electrolytic capacitors and the individual components, particularly regarding its manufacturing, particularly with respect to a high energy density.

The present disclosure is directed toward overcoming one or more of the above-mentioned problems, though not necessarily limited to embodiments that do.

SUMMARY

It is an objective of the present invention to overcome the prior art shortcomings and to provide an ameliorated energy storage of an electrolytic capacitor and its individual components as well as to provide improved related methods and devices.

At least this problem is solved, in an aspect, by a method for manufacturing an energy storage of an electrolytic capacitor having the features of claim 1. Such a method comprises the steps explained in the following.

Initially, a first component of an energy storage of an electrolytic capacitor is placed onto a transfer area. Such a component is particularly an anode, a cathode or as separator of the electrolytic capacitor. Typically, the component is provided in form of a foil or sheet.

Afterwards, the first component is optically measured to determine its actual position. The term "position" encompasses a relative location and a relative rotation with respect to the transfer area or another component.

Afterwards, a deviation between the actual position and a desired position is determined.

Then, the first component is gripped with a gripper. In doing so, the gripper does initially not change the actual position of the first component.

Subsequently, however, the actual position of the first component is adjusted if a deviation between the actual position and the desired position has been previously determined. This adjusting is performed with the gripper.

Afterwards, the first component is placed onto a stacking area by not changing the adjusted actual position.

The precedingly explained steps of placing the component, optically measuring the position of the component, determine a deviation between the actual position and the desired position, gripping the component and adjusting the actual position in case of a deviation to a desired position are then repeated with a further component of the energy storage of an electrolytic capacitor. This further component is then placed onto the first component to form a stack or pile. In addition, the further component is fixed on the stack, e.g., by a fixation device.

Afterwards, the steps of placing the component, optically measuring the position of the component, determine a deviation between the actual position and the desired position, gripping the component and adjusting the actual position in case of a deviation to a desired position are then repeated with a further component of the energy storage of an electrolytic capacitor, wherein the further component is placed onto a topmost component of the stack to enlarge the stack. The further component is then fixed on the stack. Thus, the second further component is placed on the first further component (which in turn itself is placed on the first component). All subsequently placed further components will be put onto the top of the stack each after the other.

The steps of placing further components with a determined and adjusted actual position as well as fixing the further components on the pile are repeated a plurality of times (e.g., 1 to 100 times, in particular 2 to 95 times, in particular 3 to 90 times, in particular 4 to 85 times, in particular 5 to 80 times, in particular 6 to 75 times, in particular 7 to 70 times, in particular 8 to 65 times, in particular 9 to 60 times, in particular 10 to 55 times, in particular 11 to 50 times, in particular 12 to 45 times, in particular 13 to 40 times, in particular 14 to 35 times, in particular 15 to 30 times, in particular 20 to 25 times) until a complete stack of a desired height has been formed.

Finally, the complete stack is fixed after the last further component has been placed on top of the stack.

By optically measuring the components of the stacking process, an exact position determination is carried out. Consequently, the components can subsequently be precisely stacked one above each other by a pick-and-place process. Due to the fixation of the individual components on the previously positioned component, care is taken that the exact position of the placed components does not change after the placing process. Since the position determination is optically carried out without touching the components, the risk of damaging the components during the piling process is significantly reduced.

In an embodiment, the components to be stacked or piled are fixed on the transfer area by means of a vacuum applied to the surface of the transfer area. This enhances the reliability of the optical measuring process and serves for a highly precise position determination.

In an embodiment, fixing the complete stack is achieved by wrapping a self-adhesive film around at least a section of the stack. Typically, the section of the stack wrapped by the self-adhesive film encompasses all components that have been stacked one above each other, but not over their entire area. Thus, the self-adhesive film runs around all stacked components, but does not cover the whole area of all components, but rather leaves free an area of each component. Such an arrangement serves for precise stacking of components and allows at the same time to electrically contact the individual components of the formed energy storage.

According to the present invention it is particularly envisioned that the self-adhesive film is arranged at or on the above-mentioned stacking area, wherein the first component of the energy storage is placed onto the self-adhesive film.

In one embodiment, the steps, particularly all steps, of the above method for manufacturing are automated executed.

In an aspect, the present invention relates to a device for manufacturing a stacked capacitor, preferably a stacked aluminum capacitor, wherein the device is particularly configured to execute or conduct a method of manufacturing an energy storage of an electrolytic capacitor according to the above aspect or any embodiment thereof. The device comprises:

a spring-loaded stacking area,
a receptacle configured to receive the spring-loaded area,
one or more movable fixation devices being configured to releasably fix a stack of capacitor components on the stacking area, wherein particularly the one or more fixation devices are movable between an open position and a locked position,
a pick-and-place device being configured to pick a capacitor component and to place the capacitor component on the spring-loaded stacking area, wherein particularly the pick-and-place device comprise one or more recesses configured to receive the one or more movable fixation devices in the locked position.

Particularly, the stack of capacitor components has a repeating sequence of capacitor components, particularly a repeating sequence of an anode (foil), a separator (sheet), and a cathode (foil).

In one embodiment, the pick-and-place device comprises a gripper configured to grip and release a capacitor component, wherein particularly the gripper comprises a suction device. In one embodiment, the pick-and-place device is configured to move the capacitor component at least along a placing direction, particularly by means of an actuator actuatable along the placing direction. In one embodiment, the pick-and-place device is configured to move the spring-loaded stacking area along the placing direction, particularly by pressing down the spring-loaded stacking area. In one embodiment, the pick-and-place device is configured to move a capacitor component between a transfer area and the spring-loaded stacking area, particularly along in conveying direction or plane being perpendicular to the placing direction.

In one embodiment, the one or more fixation devices are configured as tongues. In one embodiment, each of the one or more fixation devices is movable along a direction within a first plane, wherein the first plane is perpendicular to the placing direction. In one embodiment, each of the one or more fixation device are movable along a direction in the first plane between the open position and the locked position, wherein particularly in the open position a capacitor component can be place on the topmost capacitor component of the stack and in the locked position the top most component of the stack is fixed or held in place by the one or more fixation devices. In one embodiment, the device for manufacturing a stacked capacitor according to the present invention comprises two to six fixation devices, wherein particularly each of the fixation devices is movable along an individual direction within the first plane.

In an aspect, the present invention relates to a method for manufacturing an energy storage of an electrolytic capacitor having the steps explained in the following.

Initially, a first component of an energy storage of an electrolytic capacitor is shaped to obtain a desired geometry of the first component. To give some examples, pressing, laser cutting, punching, cutting, and eroding are appropriate techniques for this shaping process.

Directly prior to the shaping process, during the shaping process or directly after the shaping process, the first component is provided with a marking element. In an embodiment, the shaping and the introducing of the marking element into or onto the first component is accomplished in one and the same manufacturing step. In any case, there is an immediate temporal relationship between the shaping process and the step of providing the component with the marking element. Therefore, the marking element is very precisely aligned and positioned with respect to an outer geometry of the component. The marking element can be positioned and designed such that it matches optimally the process requirements of the component considering further manufacturing and later assembly processes making use of the component.

In a further method step, the marking element of the first component is optically measured to determine an actual position of the first component. As outlined above, the term "position" encompasses a location and/or a rotation of the first component.

Afterwards, a deviation between the actual position of the first component and a desired position of the first component is determined.

Then, the first component is gripped with a gripper. The gripper does initially not change the actual position of the first component.

If a deviation between the actual position and the desired position has been determined, the gripper now adjusts the actual position of the first component so that it complies with the desired position.

Then, the first component is placed onto a stacking area.

The steps of shaping the component, providing the component with a marking element, optically measuring the marking element, determining a deviation between the actual position and a desired position, gripping the component, and adjusting the actual position of the component if a deviation between the actual position and the desired position has been determined are then repeated for a further component. This further component is placed—in the desired position—onto the first component to form a stack. Particularly, the further component is preferably fixed on the stack after placement to avoid an undesired dislocation.

Afterwards, the steps of shaping the component, providing the component with a marking element, optically measuring the marking element, determining a deviation between the actual position and a desired position, gripping the component, and adjusting the actual position of the component if a deviation between the actual position and the desired position has been determined are then repeated for a further component. This further component is then placed onto a topmost component of the stack to enlarge the stack. Furthermore, this further component preferably is fixed on the stack to avoid an undesired dislocation.

The steps of placing further components with a determined and adjusted actual position, and optionally fixing the further components on the stack are repeated a plurality of times (e.g., 1 to 100 times, in particular 2 to 95 times, in particular 3 to 90 times, in particular 4 to 85 times, in particular 5 to 80 times, in particular 6 to 75 times, in particular 7 to 70 times, in particular 8 to 65 times, in particular 9 to 60 times, in particular 10 to 55 times, in particular 11 to 50 times, in particular 12 to 45 times, in particular 13 to 40 times, in particular 14 to 35 times, in particular 15 to 30 times, in particular 20 to 25 times) until a complete stack of a desired height has been formed.

Afterwards, the complete stack is fixed after the last further component has been placed on the stack.

Due to the marking element, the position of the individual components to be stacked can be very precisely determined and adjusted, if necessary. Consequently, a highly precise stacking of individual components is made possible so that a safety distance between the individual components can be reduced. This reduces the necessary total volume of the energy storage so that an electrolytic capacitor comprising this energy storage has smaller dimensions than the electrolytic capacitors known from prior art. This reduces the necessary space of medical devices comprising such an electrolytic capacitor.

In an embodiment, the first or further component is provided with a marking element by laser ablating a part of the surface of the component in a patterned manner. To give an example, a circular marking element may be introduced into the surface of the component. This can be done during laser cutting the component, i.e., in the same manufacturing step as shaping the component itself.

In an embodiment, the component carries two marking elements at different positions on its surface. Then, a relative location and a relative rotation of the component can be determined particularly easy and reliable. The individual marking elements may have the same or a different appearance.

The marking element also enables a precise optical measurement of the first or further component even in case of non-optimal edge qualities or edge geometries. The concrete position of the marking element may be adapted to process needs. Thus, if a gripper or hold-down devices are used, which hinder an optical edge detection, they will not negatively influence the position determination on the basis of the marking element if the marking element is situated in an area that can be easily optically detected even in case that a gripper or hold-down device engage the first or further component.

In an embodiment, the adjusted actual position of the first or further component is double-checked by optically measuring the marking element of the first component or the marking element of the further component, as the case may be, after having placed the first component onto the stacking area or after having placed the further component onto the topmost component of the stack and after to fixing the further component. This double-checking enables a position control of the topmost further component of the stack after placing and fixing.

In an aspect, the present invention relates to a method for manufacturing a foil electrode of an aluminum electrolytic capacitor comprising the steps explained in the following.

First, an uncoated or coated aluminum foil is provided. Afterwards, the aluminum foil is laser cut to obtain a foil electrode in a desired shape.

By laser cutting the aluminum foil, cutting edges free of burrs can be produced. As a result, a capacitor made from these laser cut aluminum foils is safe against internal short circuits. Furthermore, due to the absence of burrs, the overall size of stacked aluminum foils may be reduced so that the energy density of the resulting capacitor is higher.

In an embodiment, the laser cutting is performed with an ultrashort pulse laser. Such a laser emits laser pulses having a pulse duration in the order of $10^{-12}$ seconds or less, particularly a pulse duration of $1 \times 10^{-11}$ seconds to $1 \times 10^{-14}$ seconds, particularly of $0.5 \times 10^{-12}$ seconds to $1 \times 10^{-13}$ seconds.

Particularly, in case of the foil electrode is manufactured from a coated aluminum foil, e.g., coated with a capacitance-increase coating as described below, the coating of the obtained foil electrode is at least partly removed in an embodiment, preferably by laser ablation. Advantageously, the cutting laser may be used for that purpose. In one embodiment, the coating is removed in order to introduce a marking. In another embodiment, the coating is removed in a connecting region of the aluminum foil configured to be joined with a connecting region of another aluminum foil, particularly mechanical welding.

In an aspect, the present invention relates to a device for manipulating a component, of an aluminum electrolytic capacitor, particularly an electrode foil. The device comprises a first panel and a second panel that are movable relative to each other around a pivoting axis. By such a relative pivoting, they can be transferred from a first position to a second position and vice versa. In the first position, a front side of the first panel and a front side of the second panel are arranged beside each other in the same level. Additionally, the front sides of the first panel and the second panel face the same direction in the first position.

In the second position, the front side of the first panel and the front side of the second panel are arranged directly above each other. Furthermore, the front sides are able to contact each other.

The front side of the first panel comprises a plurality of first openings through which a vacuum can be applied to a surface of the front side of the first panel. Such a vacuum can be used to apply a suction force to a component, e.g., a foil, placed on the front side of the first panel. Such a foil can be, e.g., a foil made of aluminum and is used for manufacturing an electrode of an electrolytic capacitor.

The front side of the second panel comprises a plurality of second openings through which a vacuum can be applied to a surface of the second panel. This vacuum can likewise be used to apply a suction force to a component, e.g., a foil, placed onto the front side of the second panel. The component placed onto the front of the second panel is typically the same component previously or afterwards placed onto the front side of the first panel. Thus, the device can be used to transfer a component in different stages of a manufacturing process from the front side of the first panel to the front side of the second panel and can apply a suction force to the component when it is located on the front side of the first panel and/or on the front side of the second panel. This enables an easy and precise manipulating of a component such a foil with the device. Manipulating may encompass, e.g., marking the component foil, laser ablating the component foil, particularly of at a region configured to be electrically connected and/or mechanical welded to another component foil or to a terminal, and cutting the component foil. Due to the specific design of the device, it is possible to manipulate both surfaces of the component foil that is placed onto the device.

In an aspect, the present invention relates to a method for manufacturing an electrode of an aluminum electrolytic capacitor with the device according to the preceding explanations. This method comprises the steps explained in the following.

In a first step, a coated or uncoated aluminum foil is placed on a front side of a first panel of the device such that a front side of the aluminum foil faces upwards. In this context, a vacuum is applied to the aluminum foil through openings in the front side of the first panel to keep the aluminum foil safe in place on the first panel.

Afterwards, the front side of the aluminum foil is treated in the desired way. Such treatment may encompass, e.g., the marking of the first surface. Such marking can be performed, e.g., by ablating a portion of the coating applied onto the front side of the aluminum foil.

Afterwards, the first panel is pivoted around a pivoting axis so that the front side of the first panel is placed directly above the front side of the second panel of the device. In addition, the front side of the aluminum foil contacts the front side of the second panel.

Now, the vacuum applied to the aluminum foil through the openings in the front side of the first panel is released. Prior to this, concomitantly with this or after this, a vacuum is applied to the aluminum foil through openings in the front side of the second panel. This release of the vacuum applied by the first panel and application of a vacuum by the second panel results in a transfer of the aluminum foil from the first panel to the second panel. Furthermore, due to the applied vacuum, the aluminum foil is safely kept in place on the second panel. Finally, a backside of the aluminum foil now faces upwards. Thus, the transfer of the aluminum foil from the first panel to the second panel resulted in turning the aluminum foil upside down.

Now, it is possible to treat the backside of the aluminum foil, e.g., by marking it. Furthermore, it is now possible to cut smaller entities from the aluminum foil, particularly to cut foil electrodes in the desired shape from the aluminum foil. Such cutting is, in an embodiment, performed as laser cutting.

In an aspect, the present invention relates to a foil electrode for an aluminum electrolytic capacitor. Such a foil electrode comprises an aluminum foil and a capacitance-increasing coating applied to at least one of the frontside and the backside of the aluminum foil. The capacitance-increasing coating comprises titanium oxide and/or titanium nitride, and optionally titanium carbide. By applying such a capacitance-increasing coating to the aluminum foil, it is possible to increase the capacitance of the aluminum film to a value lying in a range of from 1 mF/cm$^2$ to 10 mF/cm$^2$, in particular of from 2 mF/cm$^2$ to 9 mF/cm$^2$, in particular of from 3 mF/cm$^2$ to 7 mF/cm$^2$, in particular of from 4 mF/cm$^2$ to 6 mF/cm$^2$, in particular of from 4 mF/cm$^2$ to 5 mF/cm$^2$. Without such coating, the capacitance does not increase a value of 500 µF/cm$^2$.

In an embodiment, the capacitance-increasing coating is applied to both the front side and the backside of the aluminum foil.

In an embodiment, the capacitance-increase coating comprises titanium nitride as main component and titanium oxide as adhesion promotor for titanium nitride. In another embodiment, the capacitance-increasing coating comprises titanium oxide as main component, and titanium nitride as adhesion promotor for titanium oxide. In one embodiment, the capacitance-increasing coating comprises titanium nitride and titanium carbide. In an embodiment, the capacitance-increase coating is designed in form of a homogenous layer or single layer.

In an aspect, the present invention relates to a foil electrode for an aluminum electrolytic capacitor, wherein the foil electrode comprises an aluminum foil and a capacitance-increasing coating applied to the front side and/or the backside of the aluminum foil. In this context, the foil electrode comprises at least one optically detectable marking element formed within the capacitance-increasing coating. Such forming is done by a partial removal of the capacitance-increasing coating in a patterned manner. Thus, the capacitance-increasing coating is partially ablated, wherein the remaining portions of the capacitance-increasing coating make up together with the portions in which the coating is removed the marking element.

In an embodiment, the partial removal of the capacitance-increasing coating is done by laser ablation. This technique enables a very precise and spatially well-defined removal of the capacitance-increasing coating. Consequently, very fine patterns can be manufactured by an according partial removal by laser ablation.

In an embodiment, the capacitance-increasing coating is applied to both the front side and the backside of the aluminum foil. Furthermore, the foil electrode comprises a first marking element on the front side and a second marking element on the backside in this embodiment. The first marking element is a unique identifier of the foil electrode. The second marking element serves for enabling capturing a position of the foil electrode during the manufacturing process of an electrolytic capacitor.

A particularly appropriate unique identifier is a barcode, particularly a two-dimensional barcode or data matrix code, also known as QR code. Such a unique identifier makes it possible to track the origin of the electrode and to identify any irregularities in the manufacturing process if the capacitor does not fulfil the specifications or otherwise fails in its proper function. Consequently, the whole manufacturing process is made much more reliable and allows a high manufacturing quality and a very fast and precise identification of irregularities in the manufacturing process.

In an embodiment, the second marking element is a marking element with a simple geometric shape, such as a circle, a square, a rectangle, a triangle, a ring, etc. Such a marking element having a simple geometric shape is sufficient to optically detect the position of the electrode bearing this marking element during the manufacturing process of an electrolytic capacitor. The second marking element is typically used to identify an actual position of the foil electrode during a stacking process of individual electrodes to make up an energy storage device of an electrolytic capacitor and to adjust the actual position in case of a detection of a deviation to a desired position.

In an embodiment, the capacitance-increasing coating is a coating comprising titanium oxide and/or titanium nitride, and optionally titanium carbide. In an embodiment, the capacitance-increase coating comprises titanium nitride as main component and titanium oxide as adhesion promotor for titanium nitride. In another embodiment, the capacitance-increasing coating comprises titanium oxide as main component, and titanium nitride as adhesion promotor for titanium oxide. In one embodiment, the capacitance-increasing coating comprises titanium nitride and titanium carbide.

In an aspect, the present invention relates to a method for analyzing the quality or fitness of a section of paper to be used as separator of an electrolytic capacitor. This method comprises the steps explained in the following.

The paper strip is unrolled from a paper feeding roll. This paper strip is transferred to a paper winding roll onto which the paper strip is rolled up.

In between the paper feeding roll and the paper winding roll, a section of the paper strip is guided between two metallic rollers. A test voltage is applied between these metallic rollers. Furthermore, each of the metallic rollers contacts the section of the paper strip. Consequently, the voltage is guided from a first of the two metallic rollers through the section of the paper strip to the second of the metallic rollers.

The test voltage and/or a resulting test current between the two metallic rollers are/is continuously measured while the section of the paper strip passes the two metallic rollers.

After having passed the two metallic rollers, the section of paper is guided through a tool. This tool is arranged upstream the paper winding roll.

In the tool, a piece of paper forming a paper separator is produced from the section of the paper strip only if the test voltage did not fall below a predetermined test voltage threshold and/or if the resulting test current did not exceed a predetermined test current threshold when this section of the paper strip has been positioned between the two metallic rollers to test its conductive properties. Particularly, the tool is designed in form of a stamping tool configured to stamp the paper separator out of the section of the paper strip or in form of a cutting tool configured to cut the paper separator from the section of the paper strip.

Expressed in other words, the electric properties of the section of paper are tested between the two metallic rollers by applying the test voltage. Afterwards, a paper separator is only produced (cut or stamped) from the section of the paper strip if the section has passed the test of its electric properties. In doing so, one can distinguish between sections of the paper strip comprising a metallic inclusion body (leading to a decrease of the test voltage and an increase of the resulting test current) and sections of the paper strip being free of such inclusion bodies. Since such inclusion bodies or particles can lead to internal short-circuits of a capacitor in which a paper separator made from this paper is included, it is desirable that only paper sections without any such particles is used for manufacturing paper separators. Consequently, the presently claimed method serves for increasing the quality of an electrolytic capacitor and for reducing the risk of undesired internal short-circuits of such an electrolytic capacitor.

The test voltage is adjusted to the specific paper properties like paper thickness and paper density. In an embodiment, it lies within a range of from 200 V to 1000 V, in particular of from 250 V to 900 V, in particular of from 300 V to 800 V, in particular of from 350 V to 700 V, in particular of from 400 V to 600 V, in particular of from 450 V to 500 V.

The measurement of the electrical properties (particularly the impedance or conductivity) of the section of paper is typically performed upon moving the paper strip between the two metallic rollers, i.e., online. Thus, the measurement does not require additional time but is performed as part of the cutting procedure.

If a section of the paper strip has not passed the electric property test (i.e., its electric properties have been outside the predefined requirements), this section of the paper strip is simply rolled up onto the paper winding roll without producing (cutting or stamping) a paper separator out of it. Rather, subsequent sections of the paper strip that have successfully passed the electrical property test will then be used for cutting out further paper separators.

In an embodiment, the measurement of the test voltage and/or a resulting test current is done with an oscilloscope.

In an embodiment, the displacement of the section of the paper strip between the metallic rollers and the tool is determined by a rotary sensor sensing a displacement of the paper and by the displacement having passed since having measured the test voltage and/or the resulting test current when the section of paper strip is about to be cut. By the measurement of the paper displacement, it is immediately known when a specific section of the paper strip being currently present in the cutting tool has been passed through the two metallic rollers. Expressed in other words, the electrical properties of the section of the paper strip being present in the cutting tool and being ready to be cut by the cutting tool are immediately known when considering the displacement of the paper strip within the analyzing device used for carrying out the analyzing method.

In an embodiment, a readily produced (cut or stamped) paper separator is removed from the tool and is either packaged or further processed in additional process steps.

In an aspect, the present invention relates to a device for analyzing the quality or fitness of a section of paper to be used as separator of an electrolytic capacitor.

This device comprises a paper feeding roll carrying a paper strip. It further comprises a paper winding roll for receiving the paper strip after having unrolled the paper strip from the paper feeding roll.

Furthermore, the device comprises two metallic rollers. During operation of the device, a test voltage is applied between the two metallic rollers with the help of a power supply. The metallic rollers are designed and arranged such that each of the metallic rollers contacts a section of the paper strip when the section of the paper strip is guided between the two metallic rollers.

Furthermore, the device comprises an appliance for continuously measuring the test voltage and/or a resulting test current between the two metallic rollers. Furthermore, the device comprises a tool for producing a paper separator from the paper strip. The tool is located downstream the two metallic rollers and upstream the paper winding roll in the feeding direction of the paper strip. Particularly, the tool is designed in form of a stamping tool configured to stamp the paper separator out of the section of the paper strip or in form of a cutting tool configured to cut the paper separator from the section of the paper strip.

Finally, the device comprises a controlling appliance for allowing the tool to produce (cut or stamp) the paper separator from the section of the paper strip only if the applied test voltage did not fall below a predetermined test voltage threshold and/or if the resulting test current did not exceed a predetermined test current threshold, when the section of the paper strip has been positioned between the two metallic rollers. Thus, the device serves for testing the electrical properties of individual sections of the paper strip and to cut a paper separator from a specific section of the paper strip only if the electric properties of this specific section have to be proven to lie within predefined specifications. In doing so, the device is able to guarantee that paper separators cut with the device do not comprise metallic particles that would impart the insulation properties of the paper separator made from this paper.

In an embodiment, the device comprises a rotary sensor to determine a displacement of the paper and thus the displacement of the paper strip transferred from the paper feeding roll through the measuring device and the tool towards the paper winding roll.

In an aspect, the present invention relates to a further method for manufacturing an energy storage of an electrolytic capacitor. This method comprises the step of stacking or piling a plurality of components of an energy storage of an electrolytic capacitor above each other to obtain a stack or pile. The stack or pile has a repeating sequence of a cathode, a separator, an anode, and a further separator.

According to this aspect of the present invention, each separator comprises two layers of paper placed above each other. By making up a paper separator from two independent paper layers, the risk of undesired internal short-circuits due to metallic particles in the paper layer can also be significantly reduced. This is due to the fact that the probability that different conductive particles in individual paper layers are directly placed above each other is extremely low. This method does not require a specific tool for testing the electric properties of a paper to be used for cutting a paper separator from it. Thus, it facilitates manufacturing of an electrolytic capacitor. However, the resulting electrolytic capacitor has a somewhat higher thickness since it requires in each case two layers of paper between the individual electrodes of the resulting electrolytic capacitor. Nonetheless, this method is a very simple and effective possibility to increase the electrical safety of an electrolytic capacitor.

In an aspect, the present invention relates to an electrolytic capacitor with an energy storage comprising a stack or pile having a repeating sequence of a cathode, a separator, an anode and a separator. According to this aspect of the present invention, each separator comprises two layers of paper placed above each other.

All embodiments of the different methods can be combined in any desired way and can be transferred either individually or in any desired combination to any other of the disclosed methods, to the disclosed devices, to any of the disclosed foil electrodes and/or to the disclosed electrolytic capacitor. Furthermore, all embodiments of the disclosed devices can be combined in any desired way and can be transferred either individually or in any arbitrary combination to any of the other devices, to any of the disclosed methods, to any of the foil electrodes and/or to the electrolytic capacitor. Likewise, all embodiments of the disclosed foil electrodes can be combined in any desired way and can be transferred either individually or in any arbitrary combination to any of the disclosed methods, to any of the disclosed devices, to the respective other foil electrode and/or to the described electrolytic capacitor. Finally, all embodiments of the described electrolytic capacitor can be combined in any desired way and can be transferred either individually or in any arbitrary combination to any of the disclosed methods, to any of the disclosed devices and/or to any of the disclosed foil electrodes.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Further details of aspects of the present invention will be explained with respect to embodiments and accompanying Figures. In the Figures.

DETAILED DESCRIPTION

Figure 1:
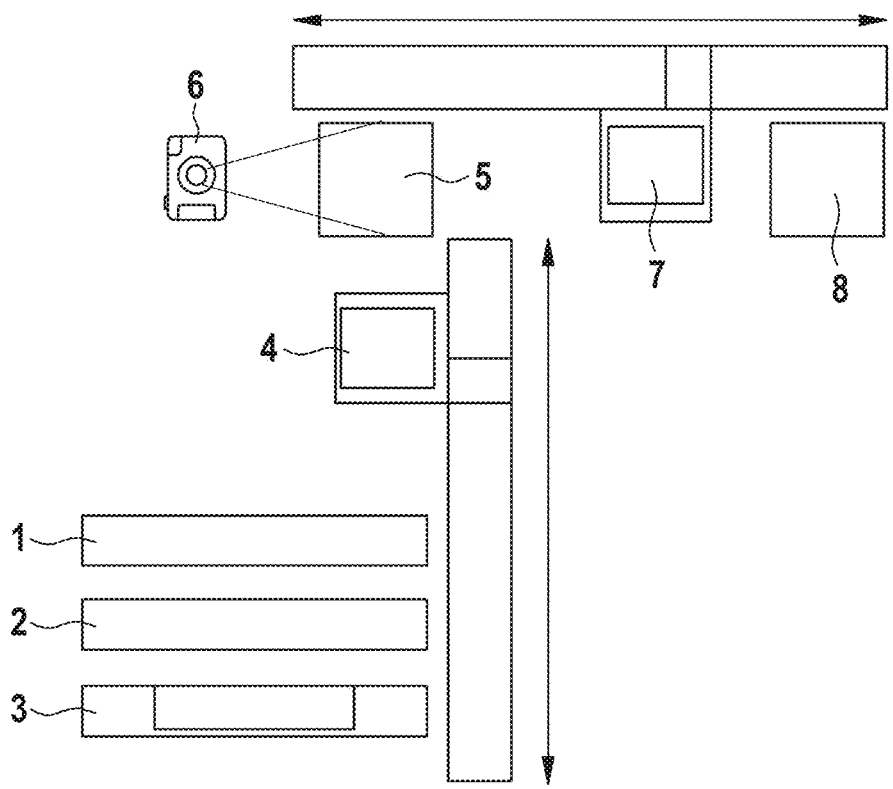
FIG. 1 shows a schematic sketch of a device for manufacturing an energy storage of an electrolytic capacitor.

FIG. 1 shows a schematic depiction of a device that can be used for manufacturing an energy storage of an electrolytic capacitor. A first component 1, a second component 2, and a third component 3 can be fed by means of a first pick-and-place device 4 to a transfer area 5. The actual position of that component chosen from the first component 1, the second component 2 and the third component 3 that has been transferred to the transfer area is then optically measured by an optical measurement system 6. In doing so, a deviation between the actual position of the respective component on the transfer area 5 and a desired position can be determined. Afterwards, the respective component is gripped by a second pick-and-place device 7 serving as gripper and adjusting the actual position of the component to the desired position if a deviation has been determined. The second pick-and-place device 7 then transfers the component from the transfer area 5 to a stacking area 8.

This process is repeated for a plurality of times so as to place a plurality of first components 1, second components 2 and third components 3 in a desired sequence one above each other onto the stacking area 8.

The first components 1 can be, e.g., anodes. The second components 2 can be, e.g., separators. The third components 3 can be, e.g., cathodes. By choosing a desired number of first components 1, second components 2 and third components 3 and by placing them in any desired sequence on the stacking area 8, an energy storage of an electrolytic capacitor may be produced.

The optical measurement system 6 serves for an exact positioning of the respective component on the piling area 8.

To avoid an undesired dislocation of any of the components placed onto the already formed stack on the stacking area 8, the individual components are fixed on the already formed stack after having them placed on the topmost layer of the already formed stack. If the stack formed on the stacked area 8 is completed, the completed stack is fixed so that it can be easily transferred to be manipulated in a further process step without risking a dislocation of one or more of the stacked components.

Thus, the precise alignment of the individual components and the precise piling of the individual components serve for an increase of the energy density of the energy storage.

Figure 10A:
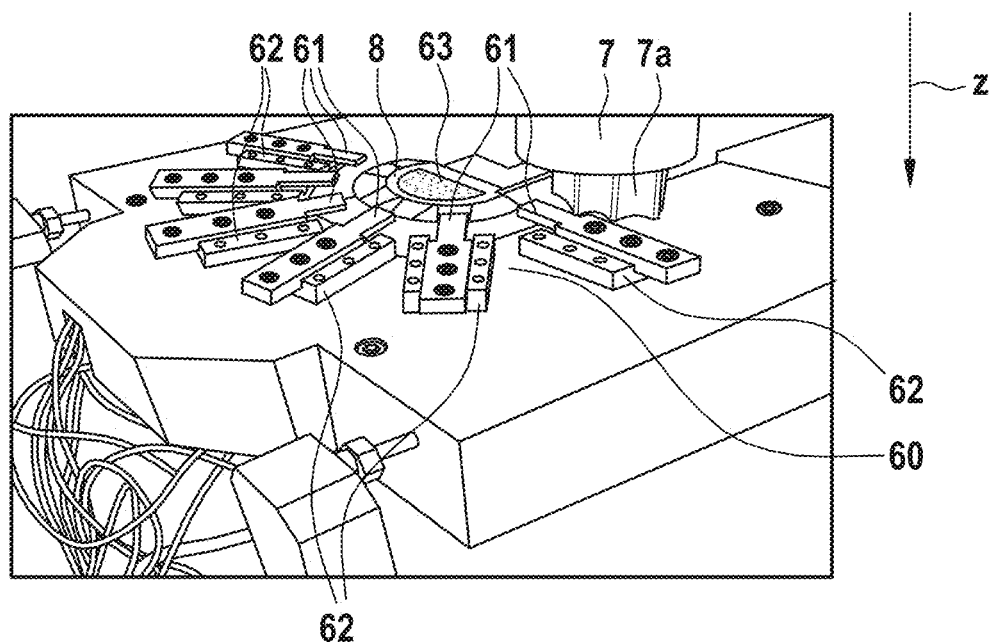
FIG. 10A-L shows a device and a mode of operation for manufacturing an energy storage of an electrolytic capacitor according to the present invention.
Figure 10B:
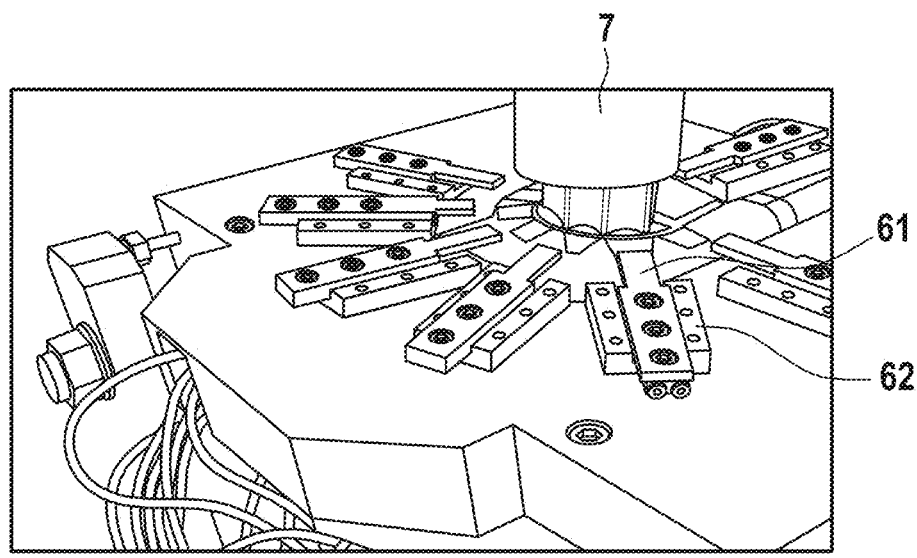

FIGS. 10A to 10B illustrate the above described stacking of components in more detail.

In FIG. 10A, a device for stacking of the capacitor components is shown. The device has a spring-loaded stacking area and a receptable 60 being configured to receive the spring-loaded stacking area 8. The stacking area 8 is elastically movable along direction z. The device further comprises the above mentioned second pick-and-place device 7, which is at least in parts movable along direction z, particularly for placing a picked component on the stacking area 8 in the receptable 60, and along a first plane being perpendicular to direction z, for conveying the picked component 1, 2, 3 between the transfer area 5 and the stacking area 8. The device further comprises six fixations device 61, 62. Each of the fixations devices comprises a tongue 61 being movable between an open position, in which the tongue 61 does not extend into the stacking area 8, and a locked position, in which the tongue 61 at least partly extends into the stacking area 8, and a rail 62, on which the tongue 61 is movable mounted.

For building the stack, a self-adhesive film 63 is arranged or placed on top of the stacking area 8, wherein the self-adhesive film forms the most bottom layer on the stacking area 8 and is held by suction. The self-adhesive film comprises a plurality of tabs of flaps that are configured to wrapped around the completed stack 64 in order to fix the completed stack 64. The tongues 61 of the fixation devices are in the open position and do not extend into the stacking area 8 (FIG. 10A), particularly in order avoid an adhesion between the tongues 61 and the self-adhesive film 63.

Next, a first component 1 is placed by the second pick-and-place device 7 on the stacking area 8 and the self-adhesive film 63, respectively FIG. 10B). Here, the first component is held by suction as well, and the tongue 61 remain in the open position, particularly again in order to avoid an adhesion between the self-adhesion film and the tongue in case of the first component is very thin (e.g., 20 µm). In case of thicker first components, the tongues 62 may be move in the locked position in this stage in order to fix the growing stack in the receptacle 60.

Figure 10C:
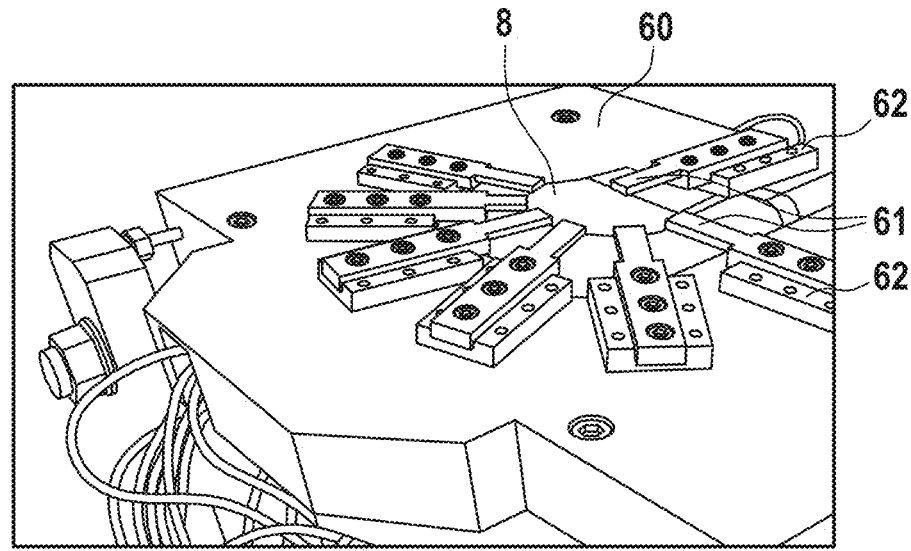

Now the repeating stacking process starts. The stack of capacitor components 64 is fixed between the spring-loaded stacking area 8 and the tongues 61 in the locked position, wherein the stacking area 8 pushes along direction z against the tongues 61 (FIG. 10C).

Figure 10D:
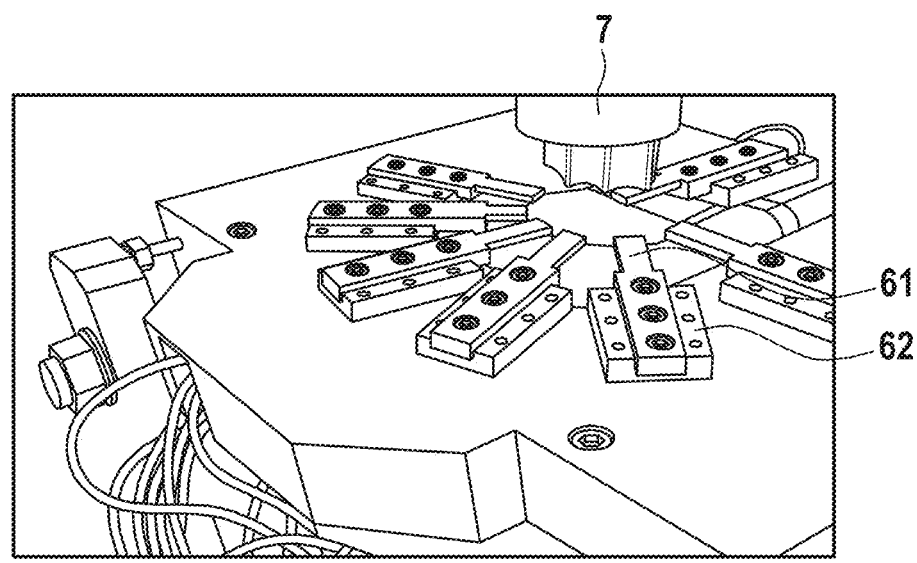
Figure 10E:
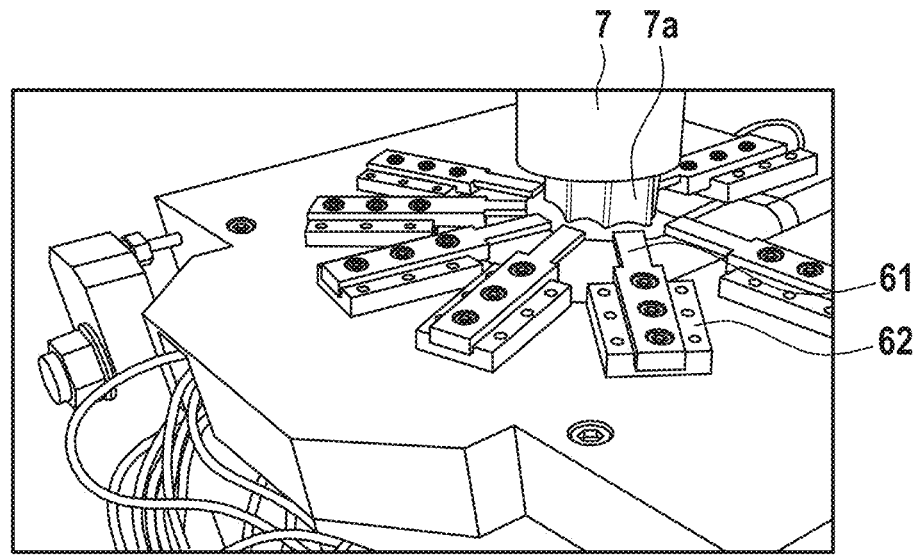
Figure 10F:
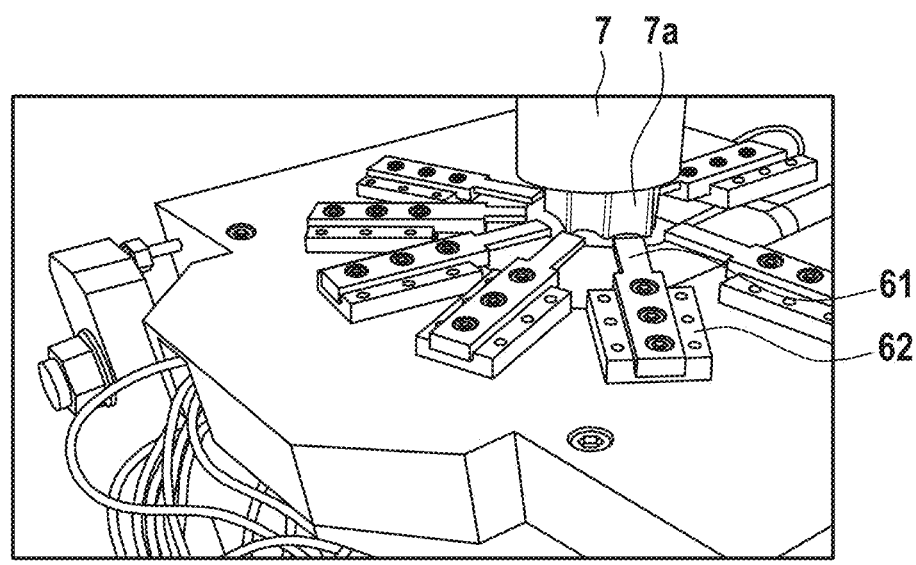
Figure 10G:
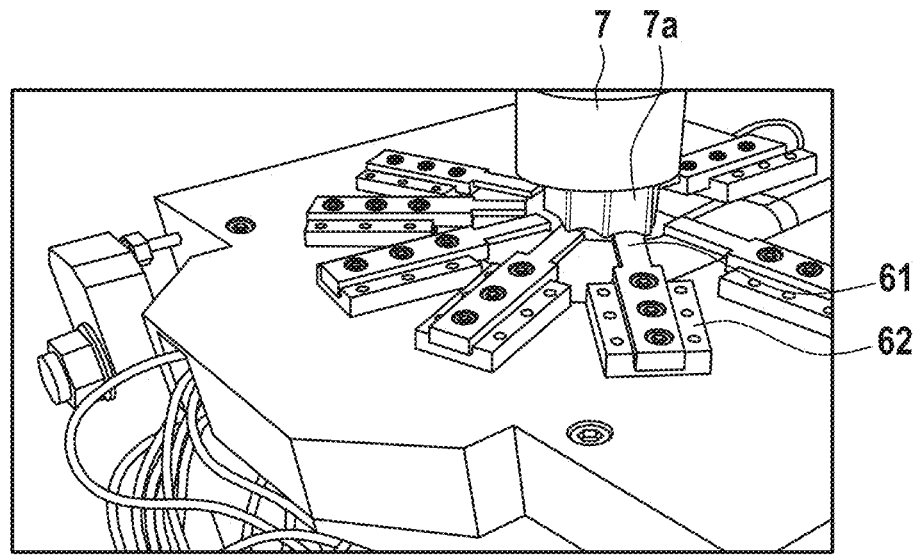

Next, the second pick-and-place device 7 places a gripped further component 2 on the tongues 61 in the locked position (FIG. 10D). Here, the second pick-and-place device 7 comprises several recesses 7a to receive the tongues 61 in the locked position in order to avoid physical contact between the tongues 61 and the second pick-and-place device 7. Since the tongues 61 are very thin, the further component 2 can be placed on the tongues 61 without being damaged while nevertheless fixing the stack 64 (FIG. 10E).

Next, the tongues 61 move from the locked position to the open position, wherein the stack 64 is fixed between the spring-loaded area 8 and the second pick-and-place device 7 (FIG. 10 F). Then, the second pick-and-place device 7 conveys or pushes down the stack 64 below the level of the tongues 61 (FIG. 10 G).

Figure 10H:
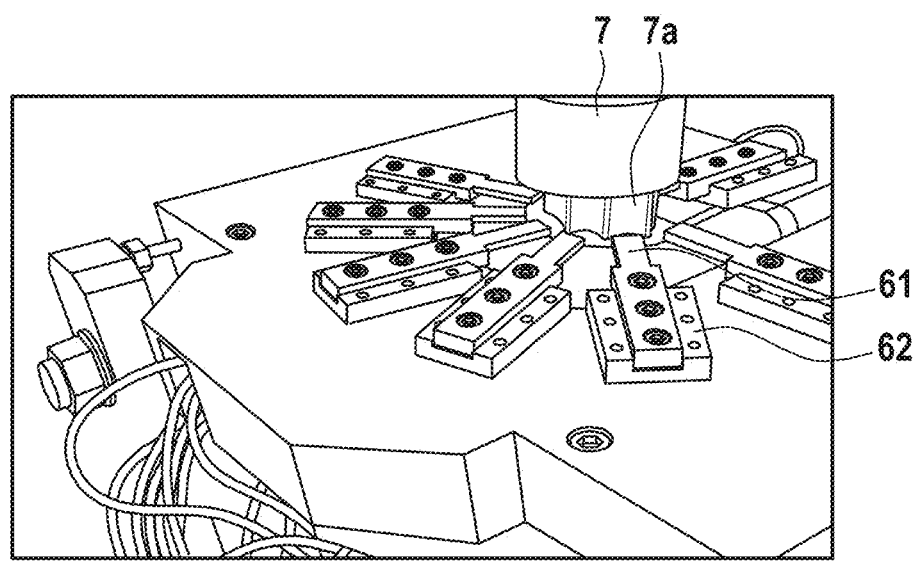
Figure 10I:
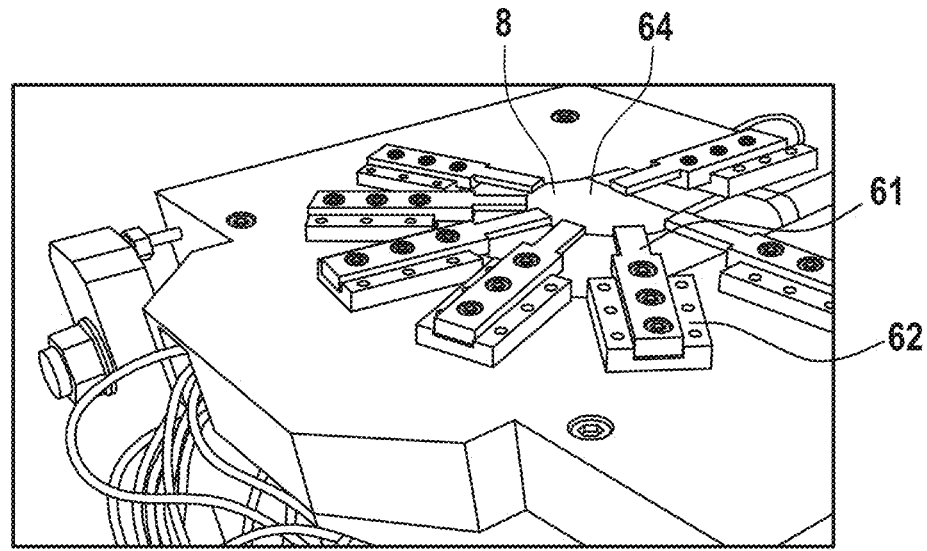

Next, the tongues 61 move back form the open position to the locked position and engage in the recesses of the second pick-and-place device 7 (FIG. 10H). Then, the second pick-and-place device 7 moves away from the spring-load stacking area, which then urges against the tongues, thereby fixing the stack 64 between the spring-loaded stacking 8 and the tongues 61 (FIG. 10I).

Figure 10J:
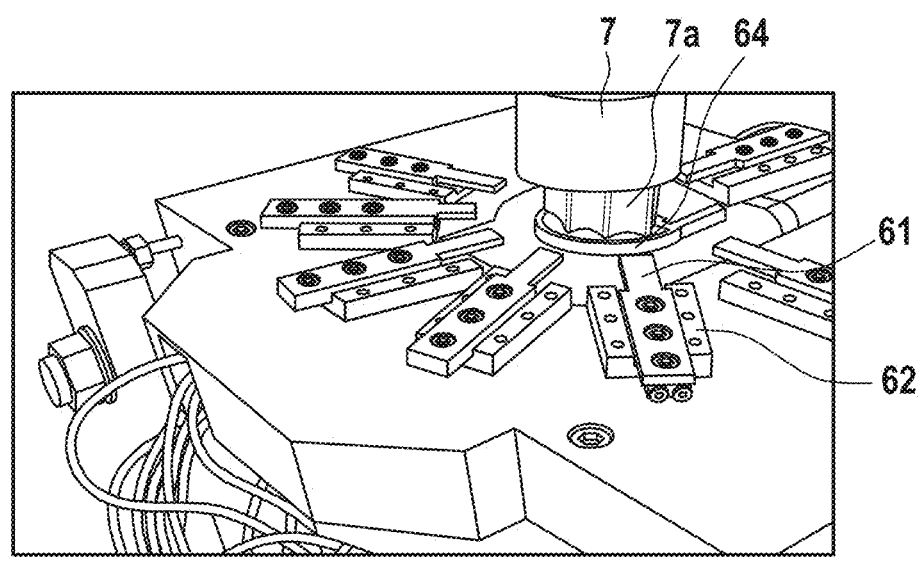
Figure 10K:
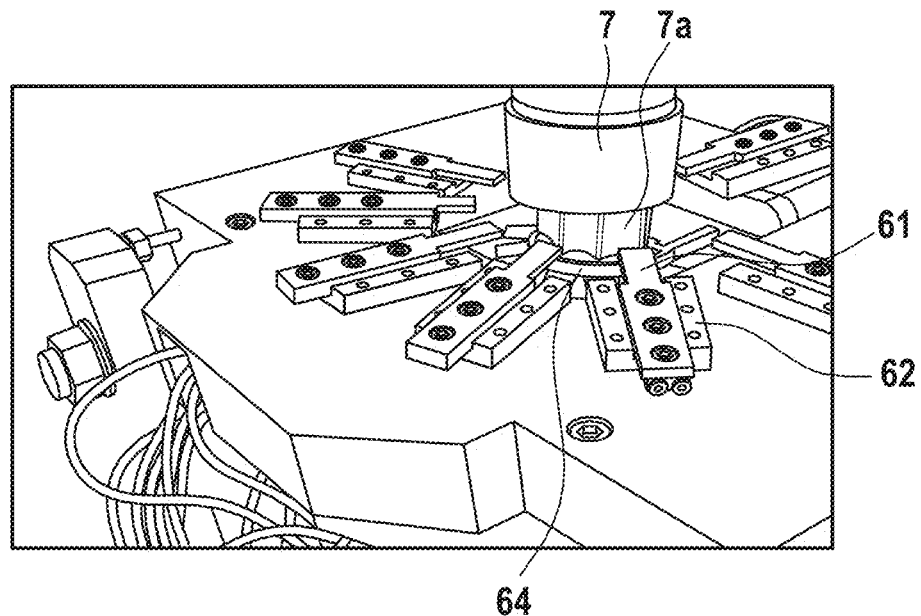
Figure 10L:
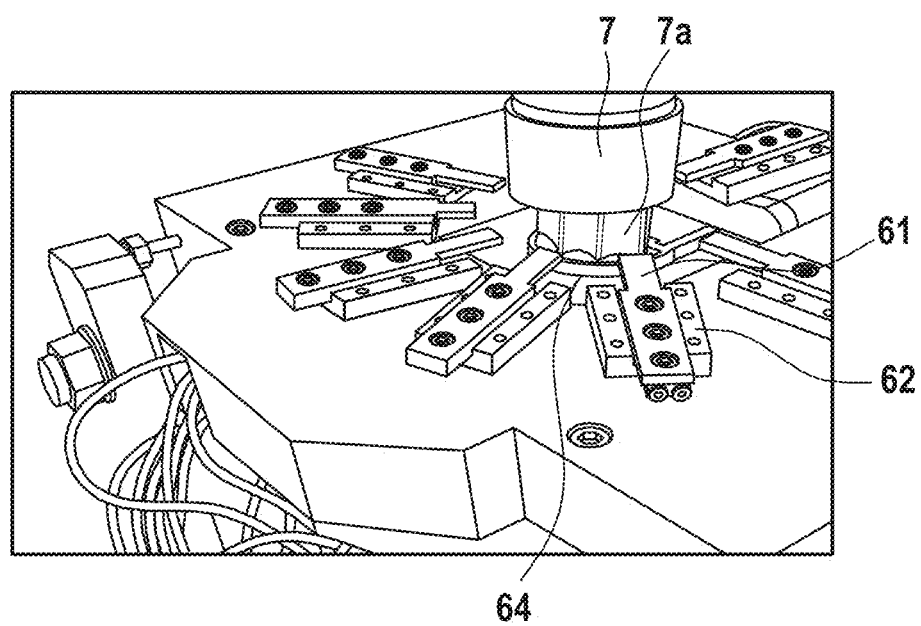

After completing the stack 61, the stack is pushed deep down by the second pick-and-place device 7, wherein the receptacle 60 and the spring-loaded stacking area 8 move against each other (FIGS. 10J-L). Thereby, the tabs of flaps of the self-adhesive film 63 are flipped by the edge of the receptacle 60 during the downward movement of the spring-loaded stacking area 8, and thus are wrapped around the completed stack 64.

Figure 11A:
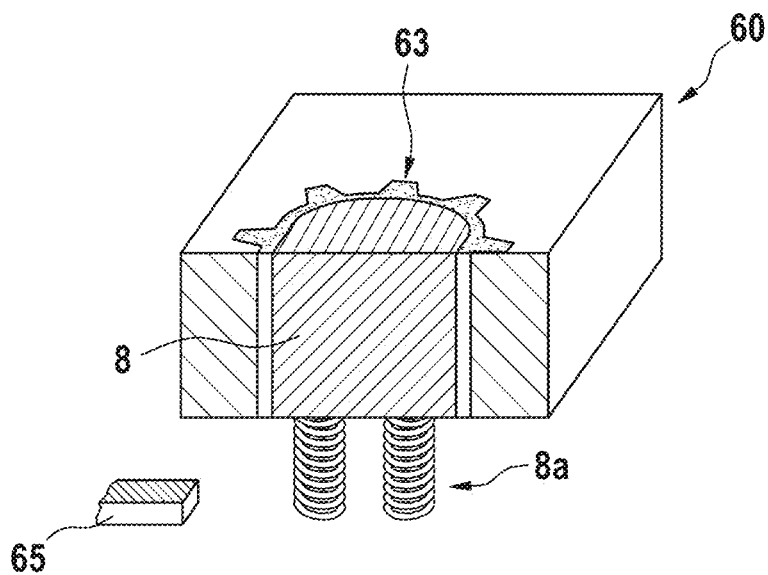
FIG. 11A-C shows cross section of a part of the device of FIG. 10.
Figure 11B:
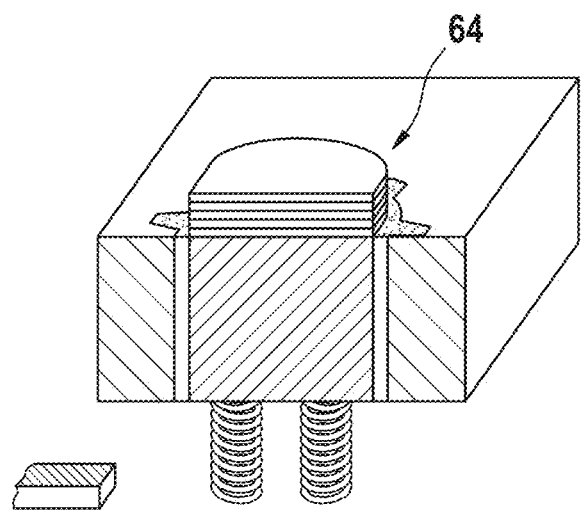
Figure 11C:
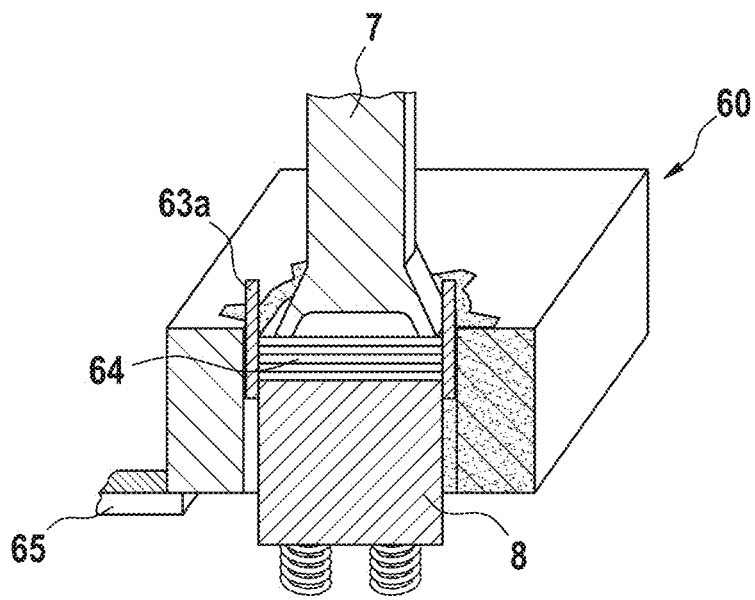

FIGS. 11A to C illustrate the above process step in more detail. In FIG. 11A, the starting situation is shown, in which the self-adhesive film 63 is placed on the spring-loaded stacking area. Here, the tabs or flaps 63a of the self-adhesive film 63 rest on a circumferential edge of the receptacle 60, until stacking of the capacitor components is completed (FIG. 11B).

For final fixation of the completed stack 64 with the self-adhesive film 63, the stack 64 together with the spring-loaded stacking area 8 is pushed down (along direction z) by the second pick-and-place device 7), and tabs or flaps 63a of the self-adhesive film 63 are flipped upwards by the circumferential edge of the receptacle 60 and wrapped around the completed stack 64 (FIG. 11C).

Figure 2:
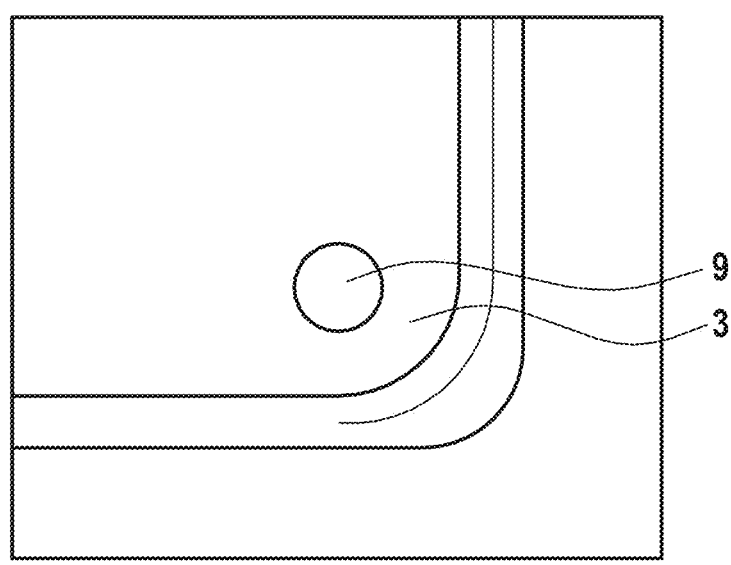
FIG. 2 shows an embodiment of a marking element.

FIG. 2 shows a capacitor cathode 3 bearing a marker 9 in its lower right corner. In this and in all following Figures similar elements will be marked with the same numeral reference. The marker 9 serves as marking element and has a circular shape. It has been applied into a coating of the cathode 3 by laser ablating a part of the coating. In doing so, a patterned shape, namely the circular shape of the marker 9, has been introduced into the coating of the cathode 3.

The cathode 3 carries two such markers 9 in two different positions. The position and rotation of the cathode 3 can be easily determined by optically capturing the two markers 9.

Figure 3A:
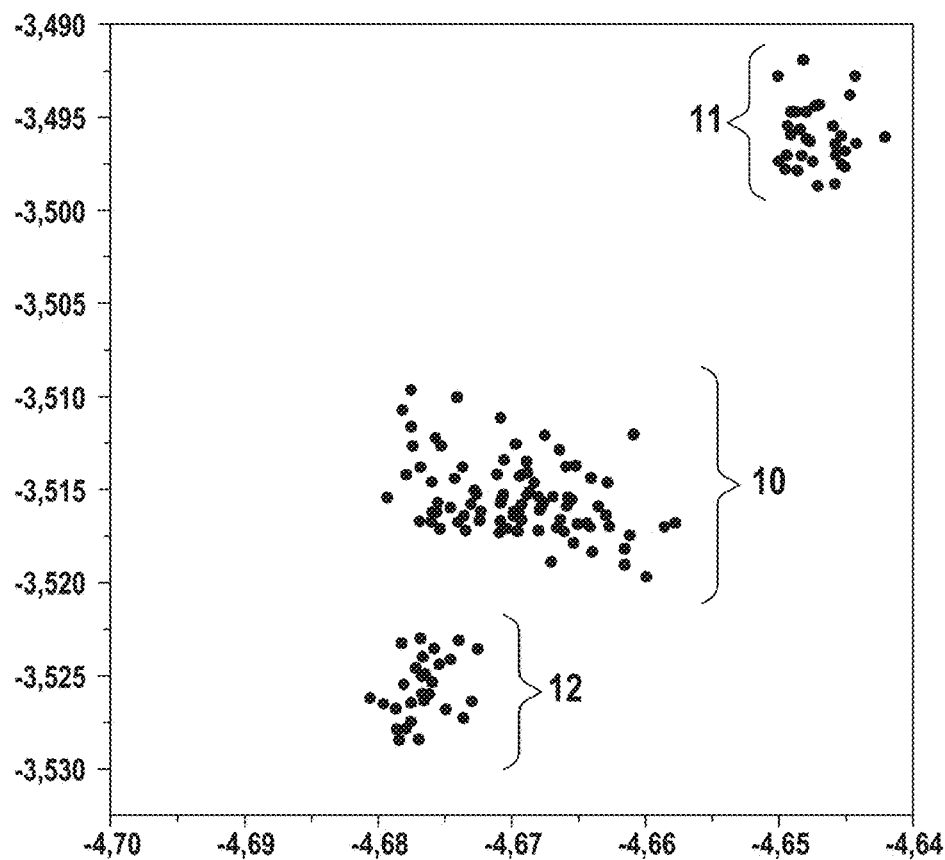
FIG. 3A shows the results of a position determination of the marking element of cathodes with an optical measuring device.

FIG. 3A shows the results of a position determination of such markers of cathodes. For this purpose, an optical measurement device has been used.

A first group 10 of measuring points is located in a narrow spatial distribution. To test whether a dislocation of a few micrometers can be detected by this method, the marking has been displaced from its original position by +20 µm in x and y direction. A second group 11 of measuring points was obtained that can be clearly distinguished from the first group 10 of measuring points. Thus, a dislocation of +20 µm is easily detectable. Furthermore, the marking has been dislocated by −10 µm in x and y direction. Also here, a clearly distinguishable third group 12 could be detected by checking the position of the marking element. Thus, even deviations of as small as 10 µm of the marker can be detected by the applied optical measuring method.

Figure 3B:
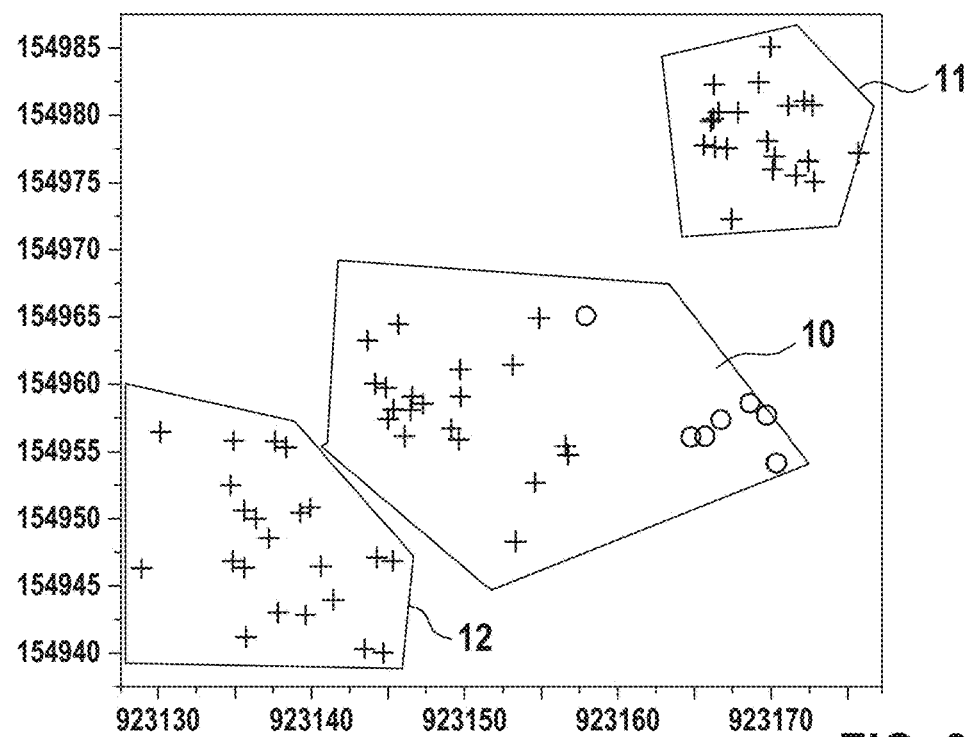
FIG. 3B shows the results of a position determination of cathodes after having placed them on a stack.

The marking element was also used to determine the position of the cathodes after having placed them on a stack. The results are depicted in FIG. 3B. Three clearly distinguishable populations (highlighted with frames) were detectable. The first population 10 corresponds to cathodes bearing the marker in its original position. The second population 11 corresponds to cathodes bearing the marking element dislocated by +20 µm in x and y direction. The third population 12 corresponds to cathodes bearing the marking element dislocated by −10 µm.

The following measuring results were obtained:
First Population 10 (Original Position of the Marking Element):

| | |
|---|---|
| Average value | 923149.26 |
| Standard deviation | 4.3943154 |
| Standard error of the average value | 1.0081251 |
| 95% confidence interval above the average value | 923151.38 |
| 95% confidence interval below the average value | 923147.15 |
| Number of samples | 19 |

Second Population 11 (+20 µm Dislocation of the Marking Element:

| | |
|---|---|
| Average value | 923169.47 |
| Standard deviation | 2.8268651 |
| Standard error of the average value | 0.6168725 |
| 95% confidence interval above the average value | 923170.76 |
| 95% confidence interval below the average value | 923168.19 |
| Number of samples | 21 |

Third Population 12 (−10 µm Dislocation of the Marking Elements:

| | |
|---|---|
| Average value | 923138.08 |
| Standard deviation | 4.3028442 |
| Standard error of the average value | 0.9173695 |
| 95% confidence interval above the average value | 923139.98 |
| 95% confidence interval below the average value | 923136.17 |
| Number of samples | 22 |

Thus, the variance is smaller than 5 µm, i.e., the position of the marking element and thus the exact position of the cathodes can be optically determined in a very precise manner.

Figure 4A:
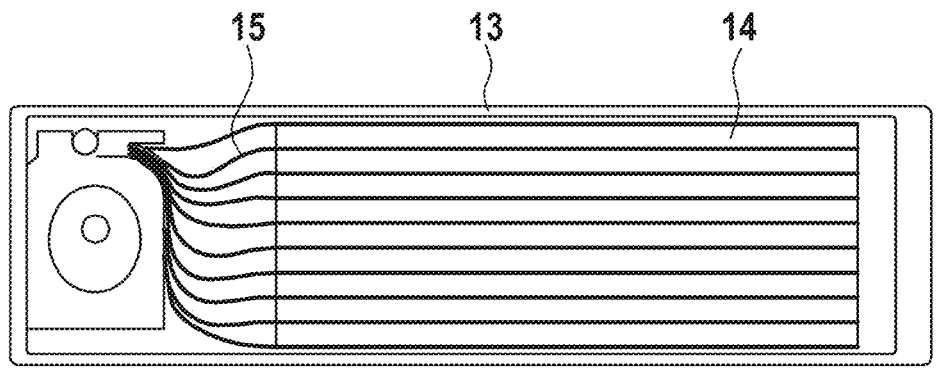
FIG. 4A shows an X-ray image of a therapeutic aluminum electrolytic capacitor.

FIG. 4A shows an X-ray image of a therapeutic aluminum electrolytic capacitor 13. A plurality of stacked anodes 14 and intermediately arranged cathodes 15 can be seen. For sake of clarity, only an individual anode 14 and only a single cathode 15 is marked with the respective numeral reference.

Figure 4B:
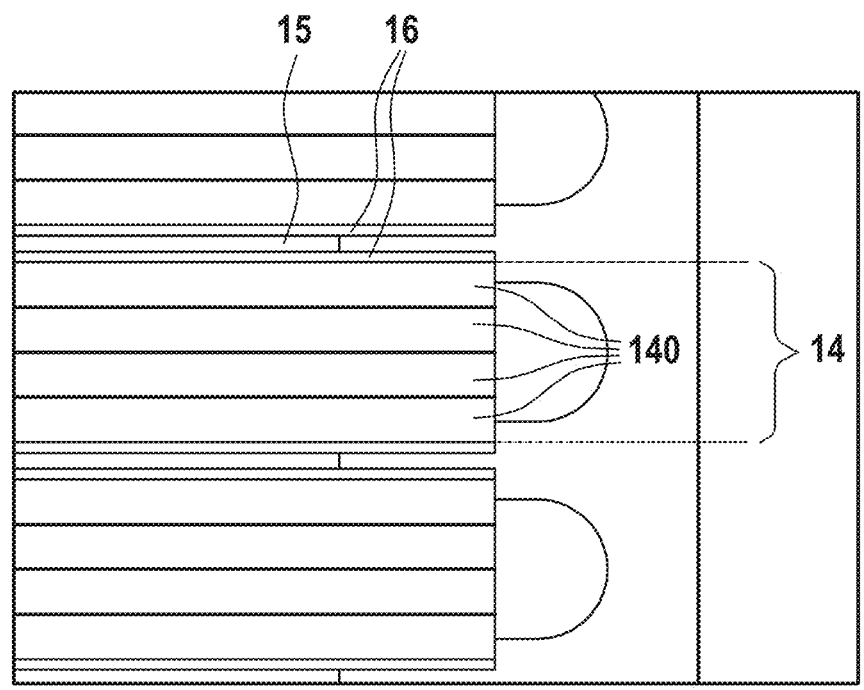
FIG. 4B shows an enlarged view of a section of the therapeutic aluminum electrolytic capacitor of FIG. 4A.

Each anode 14 is made up of a plurality of individual anode films 140, as can be seen from the enlarged view of FIG. 4B. Furthermore, a separator 16 is placed between each anode 14 and the adjacent cathode 15.

Figure 5A:
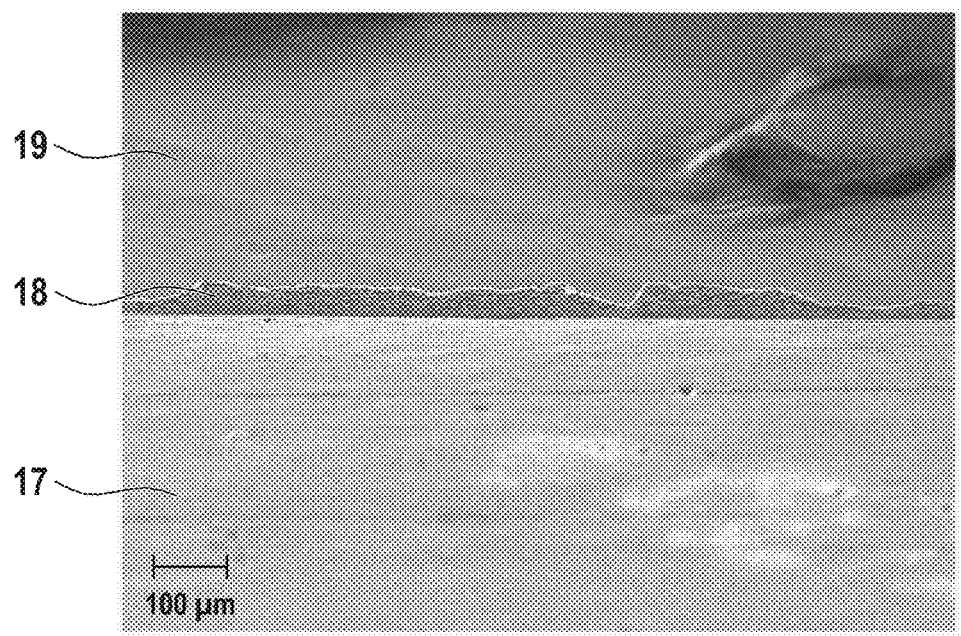
FIG. 5A shows a scanning electron microscopy image of a punching edge of a thin film.
Figure 5B:
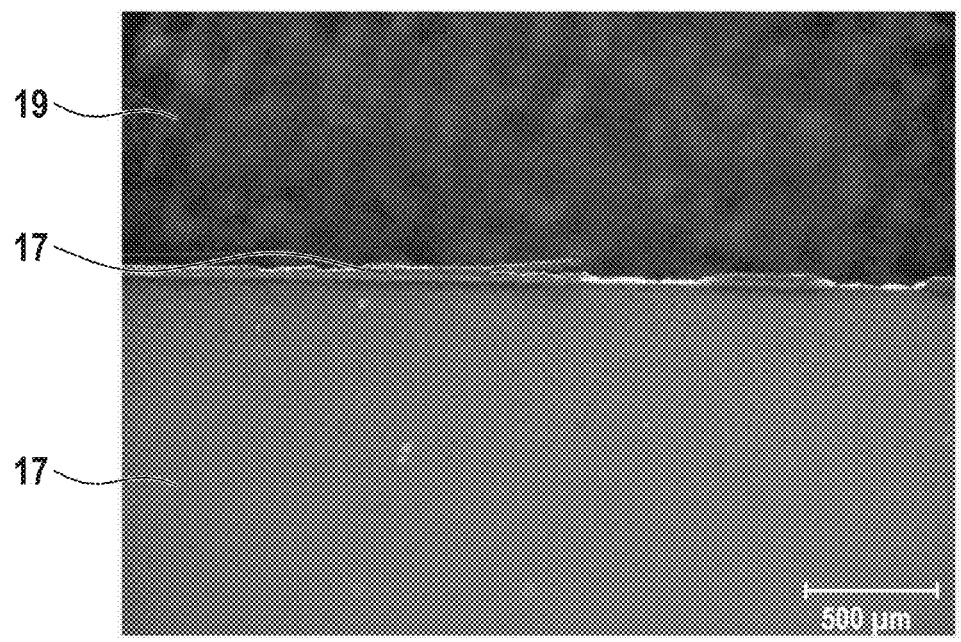
FIG. 5B shows a scanning electron microscopy image of a cut edge of a thin film.

FIGS. 5A and 5B show the drawbacks of prior art techniques for shaping a thin foil to produce an electrode. When punching a foil 17, a burr 18 results that is clearly visible against a background 19 in a scanning electron microscopy image, as illustrated in FIG. 5A. The same holds true in case of cutting a thin foil with a pair of scissors, as illustrated in the microscopy image of FIG. 5B.

Figure 5C:
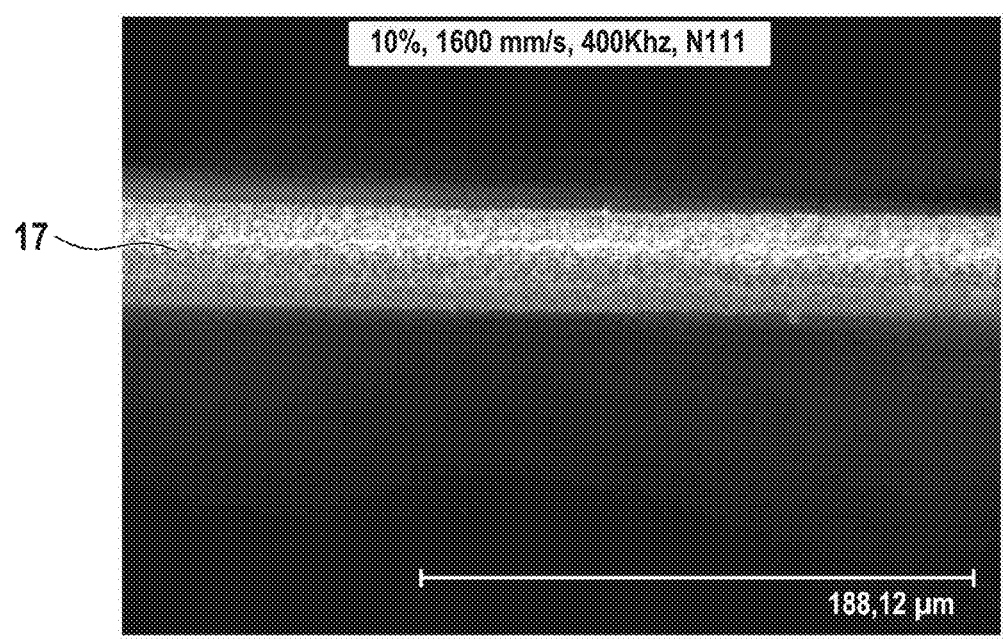
FIG. 5C shows a scanning electron microscopy image of a laser cut edge of a thin film.

In contrast, laser cutting results in a burr-free cutting edge of a thin foil 17, as illustrated in FIG. 5C. For carrying out such laser cutting, the desired contour is repeatedly followed with a laser beam of a cutting laser. For a 20 µm thin aluminum foil coated with a capacitance-increasing coating made of titanium oxide and titanium carbide, such cutting requires 6 seconds. The burr-free cutting edge of the thin foil 17 allows a closer stacking of individual thin foil layers above each other.

Figure 6A:
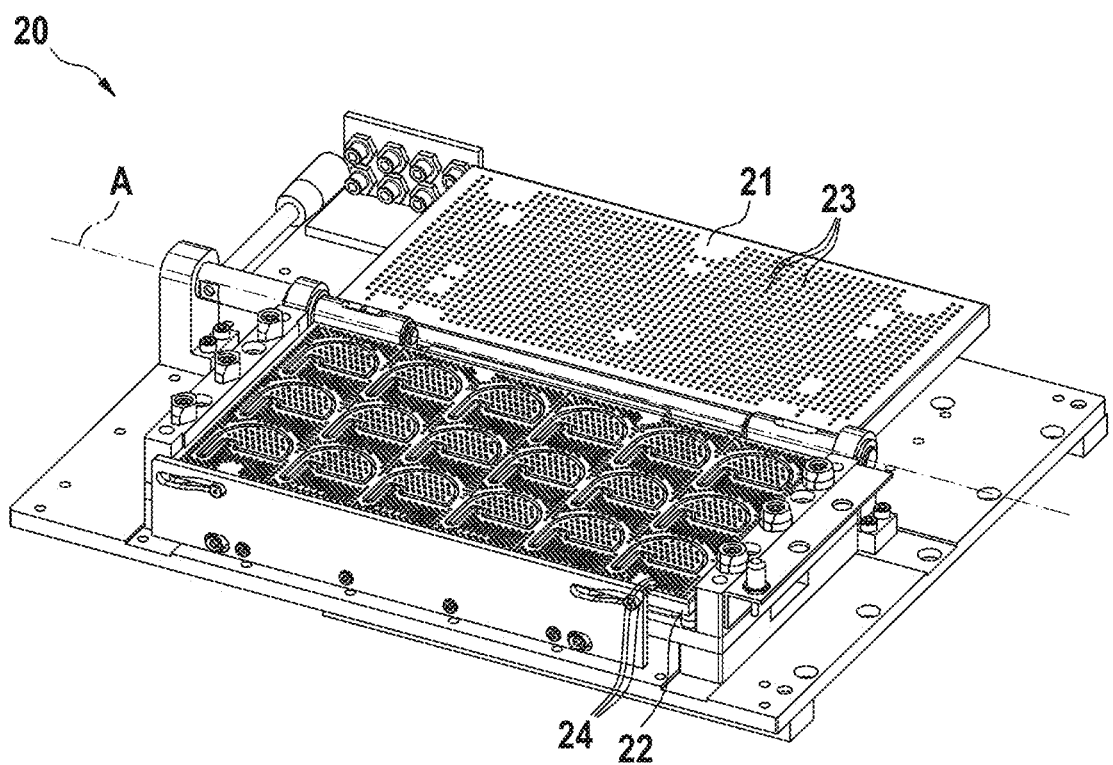
FIG. 6A shows a foil manipulating device in a first position.

FIG. 6A shows a foil manipulating device 20 having a first panel 21 and a second panel 22. The first panel 21 can be pivoted around a pivoting axis A so as to be placed directly above the second panel 22. The first panel 21 comprises a plurality of small openings 23 through which a vacuum can be applied to a surface of the first panel 21. Similar openings 24 are also present in the second panel 22 to apply a vacuum to a surface of the second panel 22.

Figure 6B:
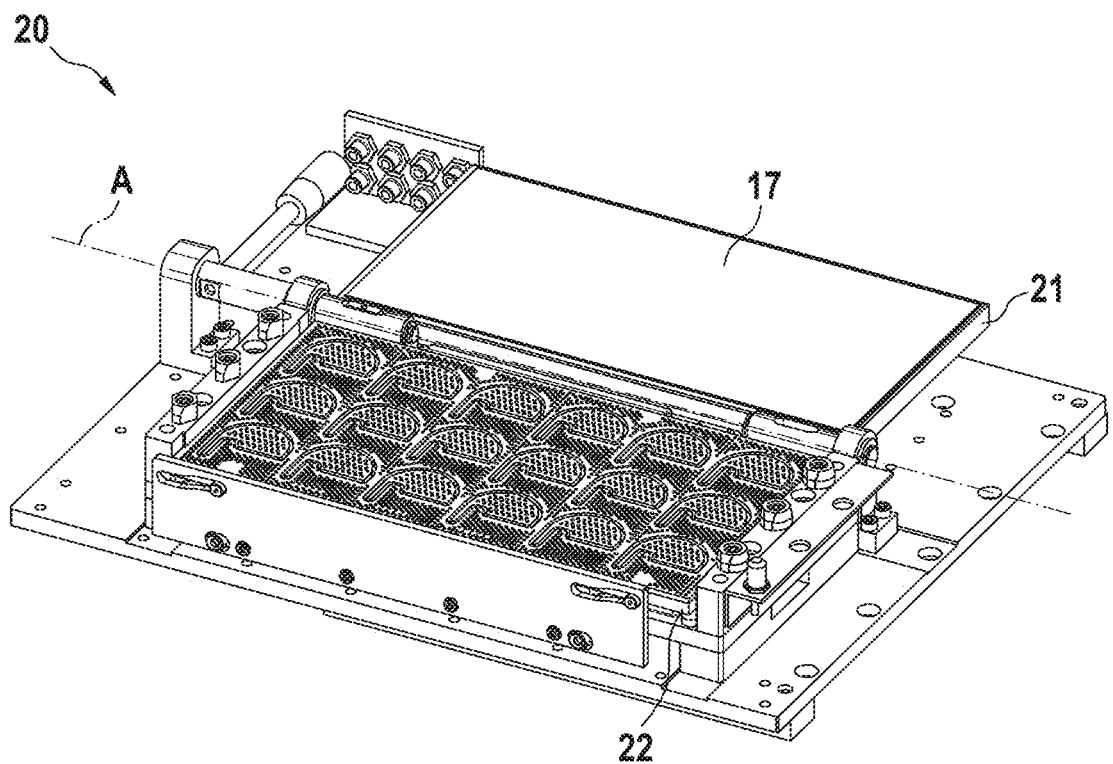
FIG. 6B shows the foil manipulating device of FIG. 6A with an applied coated aluminum foil to be treated.

FIG. 6B shows the same foil manipulating device 20 as FIG. 6A in the same position. However, here, a coated foil 17 has been placed onto the front side of the first panel 22. Furthermore, a suction force is applied by a vacuum through the openings 23 within the first panel 21 (cf. FIG. 6A). Due to the suction force, the foil 17 is kept flatly in place on the first panel 21. The front side of the foil 17 which faces upwards in the depiction of FIG. 6B can then be manipulated as desired. To give an example, the coating of the foil 17 can be partially abraded by laser abrading. In doing so, a pattern can be introduced into the coating of the foil 17.

Figure 6C:
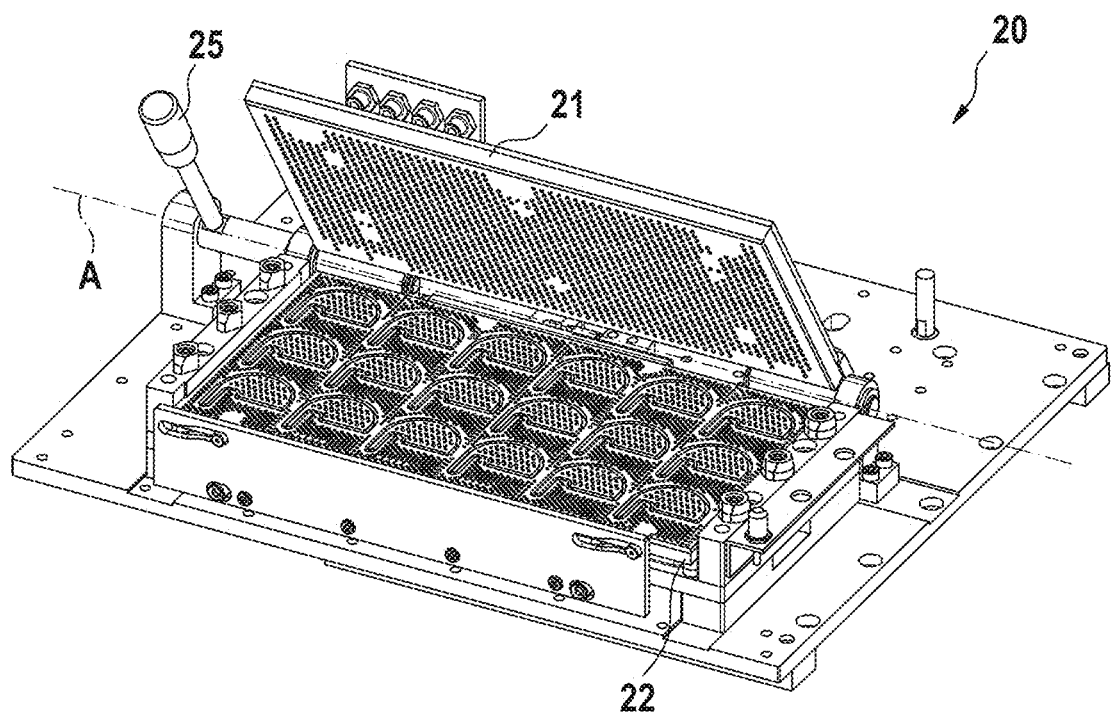
FIG. 6C shows the foil manipulating device of FIG. 6A in a transition position.

As shown in FIG. 6C, the first panel 21 can be pivoted around the pivoting axis A by moving a handle 25. In this context, FIG. 6C shows an intermediate position in which the first panel 21 is about to be moved onto the second panel 22. By such a movement, it is possible to turn the foil 17 (cf. FIG. 6B) upside down so that its backside faces upwards. Then, the foil 17 is positioned on the front side of the second panel 22. For illustrating purposes, the foil 17 is not shown in FIG. 6C.

Figure 6D:
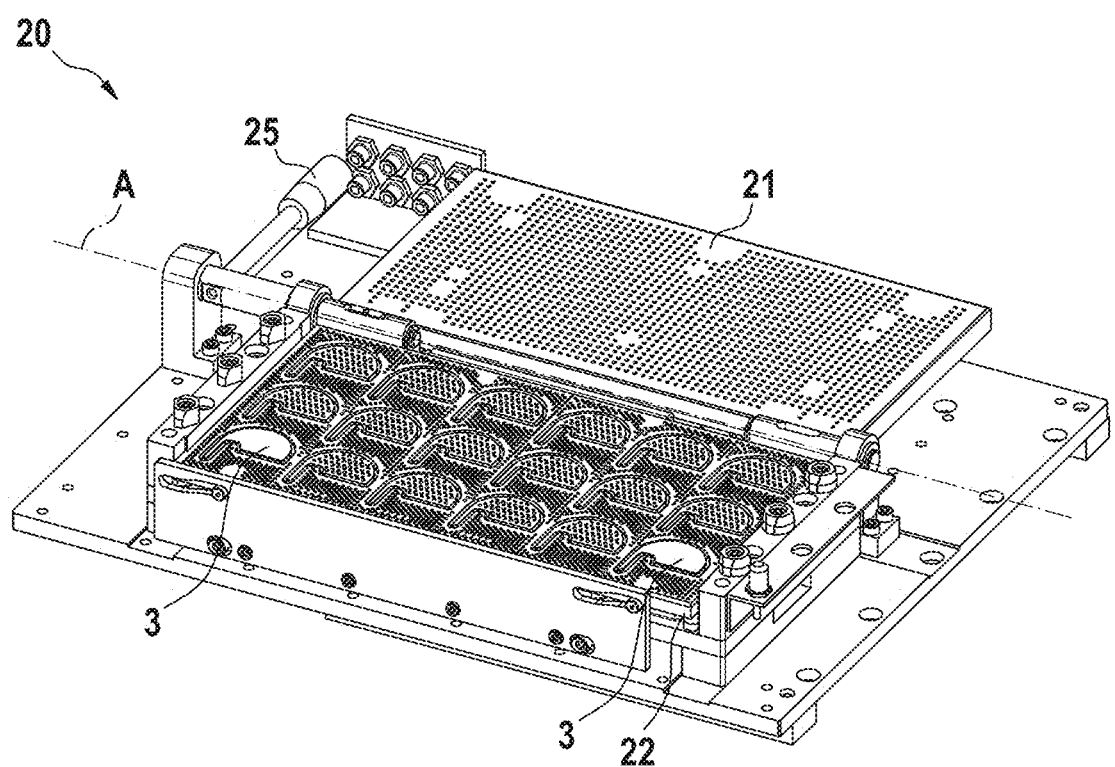
FIG. 6D shows the foil manipulating device of FIG. 6A with two laser cut electrodes.

FIG. 6D shows the final result of a process for manufacturing electrodes for an electrolytic capacitor. Individual cathodes 3 have been laser cut out of the foil 17 (cf. FIG. 6B). In the illustration of FIG. 6D, only two of the cut-out cathodes 3 are displayed. The surface of the second panel 22 can have virtually any desired shape so that differently shaped cathodes 3 can be produced. The foil 17 from which the cathodes 3 are cut is kept in place on the surface of the second panel 22 by applying a suction through the corresponding openings 24 (cf. FIG. 6A).

The device 20 shown in FIGS. 6A to 6D is particularly appropriate to first introduce a marking on the front side of the foil 17, to then turn the foil 17 upside down by pivoting the first panel 21 of the device 20 around the pivoting axis A, to then apply further markings onto a backside of the foil 17 and to finally cut out individual cathodes 3 from the foil 17.

Figure 7A:
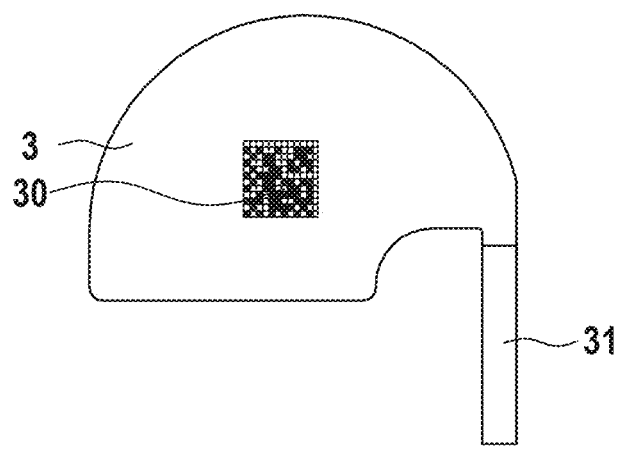
FIG. 7A shows a front side of a laser cut aluminum cathode.

FIG. 7A shows a front side of a cathode 3 that has been produced with a device as shown in FIGS. 6A to 6D by laser cutting. The front side of the cathode 3 comprises a black capacitance-increasing coating and a matrix code 30 serving as unique identifier. This matrix code 30 has been introduced into the coating of the cathode 3 by partially ablating the coating in a patterned manner. The removed part of the coating (white parts) and the remaining parts of the coating (black parts) from together the matrix code 30.

Furthermore, the capacitance-increasing coating is also removed from a connecting portion 31 of the cathode 3. This removal has also been done by laser ablation. Removal of the capacitance-increasing coating in the area of the connecting portion 31 facilitates subsequent cold welding of the connecting portions of individual cathodes.

Figure 7B:
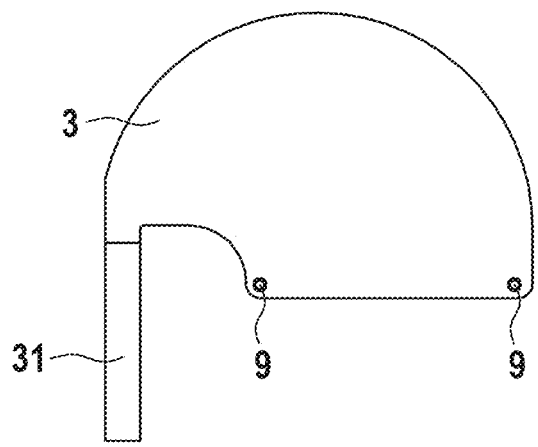
FIG. 7B shows a backside of the cathode of FIG. 7A.

FIG. 7B shows the backside of the cathode 3 of FIG. 7A. Here, two circular markings 9 can be seen that allow for precise positioning of the cathode 3 during a stacking process upon manufacturing an energy storage of an electrolytic capacitor. Reference is made in this circumstance to the explanations given with respect to FIG. 2.

Figure 7C:
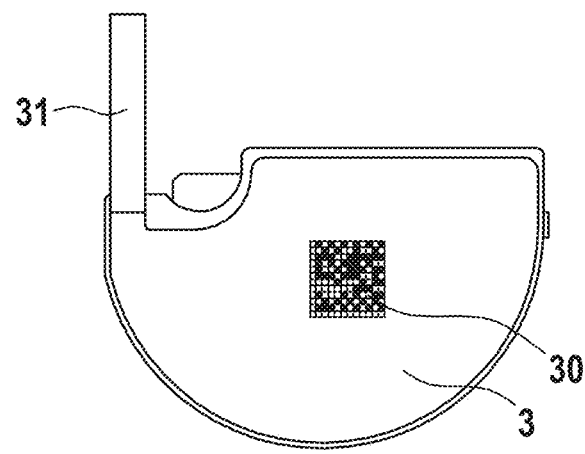
FIG. 7C shows a stack of a plurality of cathodes, anodes and separators.

FIG. 7C shows a stack were the outer cathode 3 is provided a data matrix code 30 for individually identifying the respective capacitor stack. The connective portions 31 still have their original length.

Figure 7D:
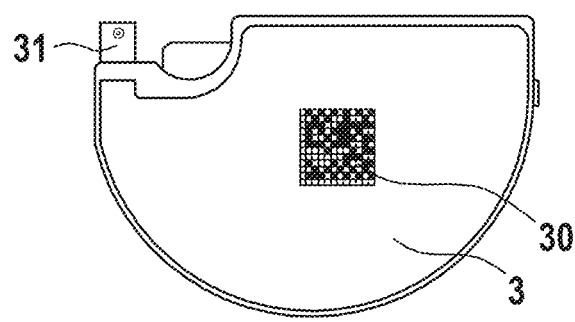
FIG. 7D shows the stack of cathodes, anodes and separators and cathodes of FIG. 7C with a shortened connection portion.

In the depiction of FIG. 7D, the connective portions 31 have been shortened and mechanical welded with a connecting sheet.

Figure 8A:
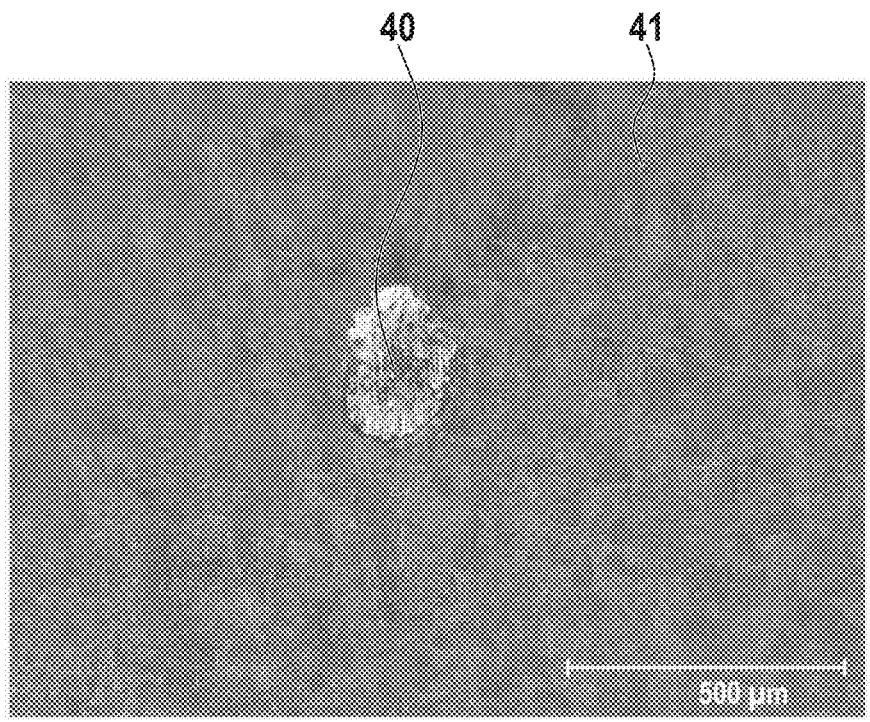
FIG. 8A shows a microscopy image of a metallic particle within a paper.

FIG. 8A shows a microscopy image of a metallic particle 40 within a sheet of paper 41. The particle 40 shown in FIG. 8A is pushed into the paper. However, there exist also metallic particles that are enclosed by paper fibers and are thus embedded into the paper.

Since the paper 41 will be wetted with electrolyte solution when used as separator paper in an electrolytic capacitor, it will swell. Therefore, the position of the metallic particle 40 is not fixed within the paper 41. Rather, there is a risk that the particle 40 moves within the paper 41 and thus finds its way through the paper 41 during the lifetime of an electrolytic capacitor. Thus, the electrical properties of such an electrolytic capacitor can change over its lifetime so that an undesired short-circuit can occur at any time after having used the electrolytic capacitor for the first time.

Figure 8B:
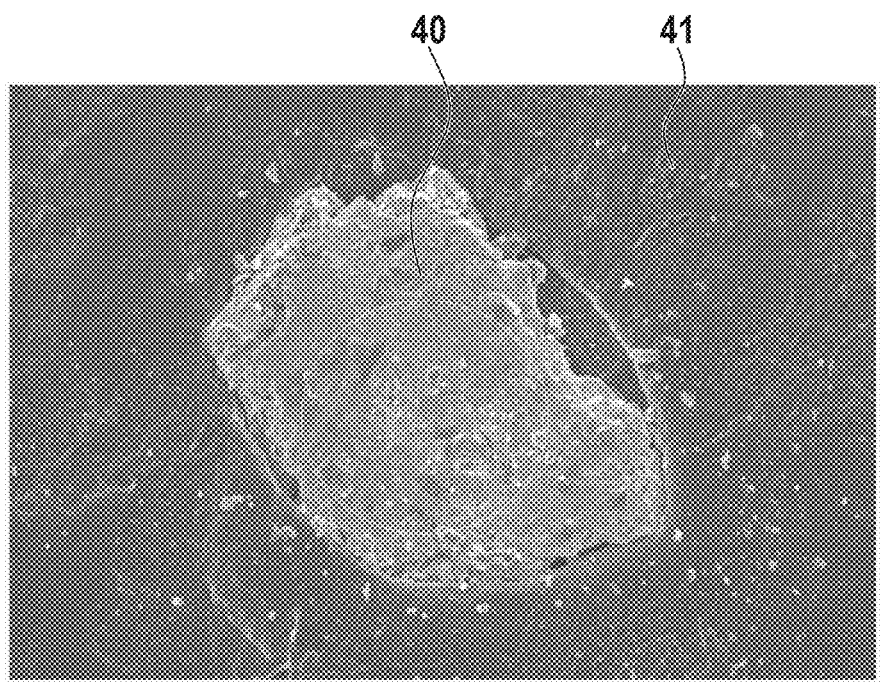
FIG. 8B shows a scanning electron microscopy image of a metallic particle within a paper.

FIG. 8B shows another scanning electron microscopy image of a metallic particle 40 pushed into paper 41 in a larger magnification.

Figure 9A:
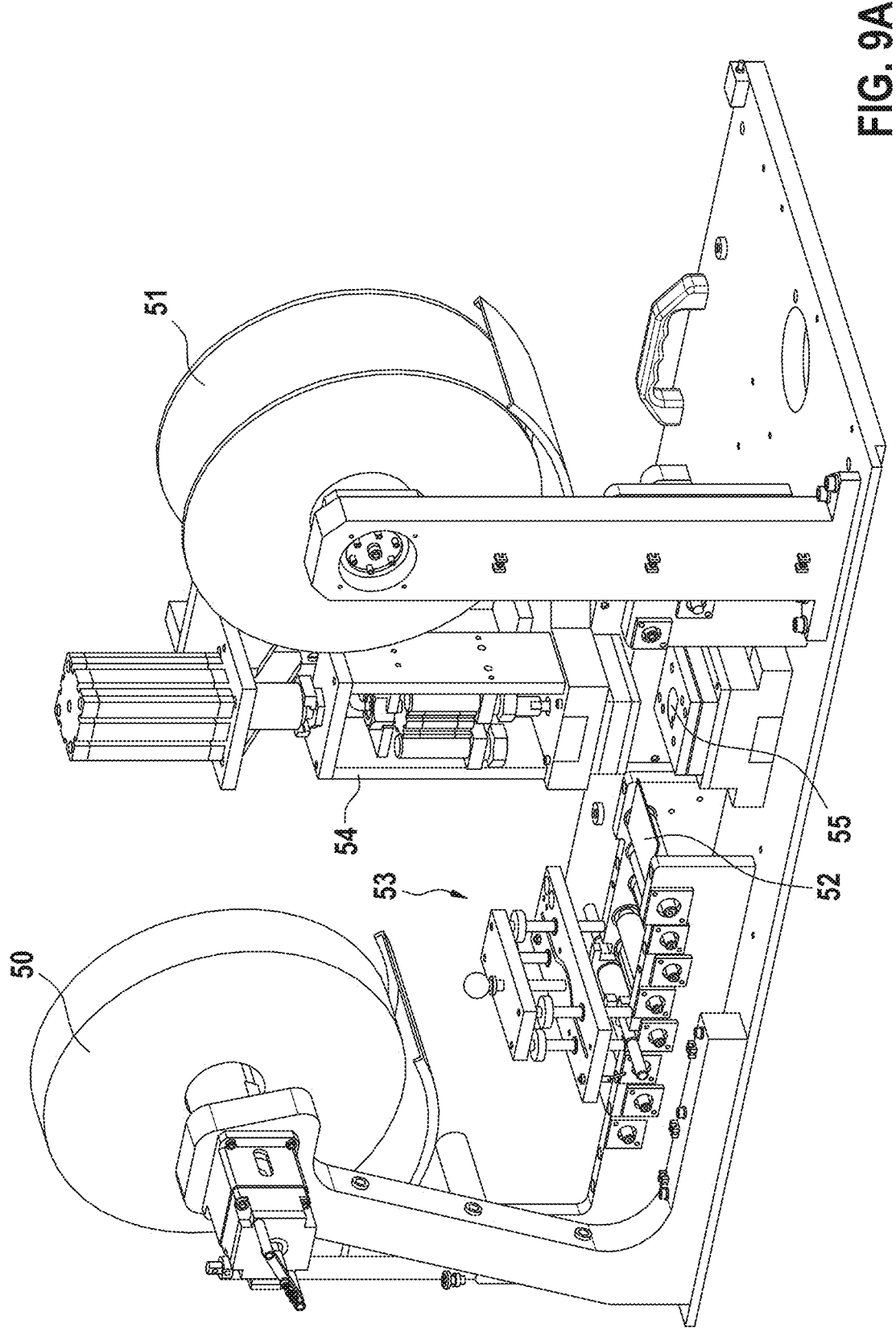
FIG. 9A shows a schematic depiction of a paper testing device.

FIG. 9A shows a schematic depiction of device for testing the electrical properties of paper to be used as separator paper for an electrolytic capacitor. This device comprises a paper feeding roll 50 and a paper winding roll 51. A strip of paper 52 is unrolled from the paper feeding roll 50 and rolled up onto the paper winding roll 51. For better illustration purposes only, only a short portion of the paper strip 52 is depicted in FIG. 9A. It should be understood that the paper strip 52 is a continuous paper strip that is not interrupted between the paper feeding roll 50 and the paper winding roll 51.

When the paper strip 52 is unrolled from the paper feeding roll 50, it is first guided through an impedance testing appliance 53. In this impedance testing appliance 53, the impedance of the paper strip 52 is tested. In doing so, it is possible to detect an inclusion of metallic particles within the paper strip 52. Afterwards, the paper strip 52 is guided towards a die cutter 54. This die cutter 54 serves for die-cutting a paper separator 55 out of the paper strip 52.

However, the die-cutting of the paper separator 55 is only done if the impedance of the section of the paper strip 52, from which the paper separator 55 is to be punched out was above a predetermined threshold.

Figure 9B:
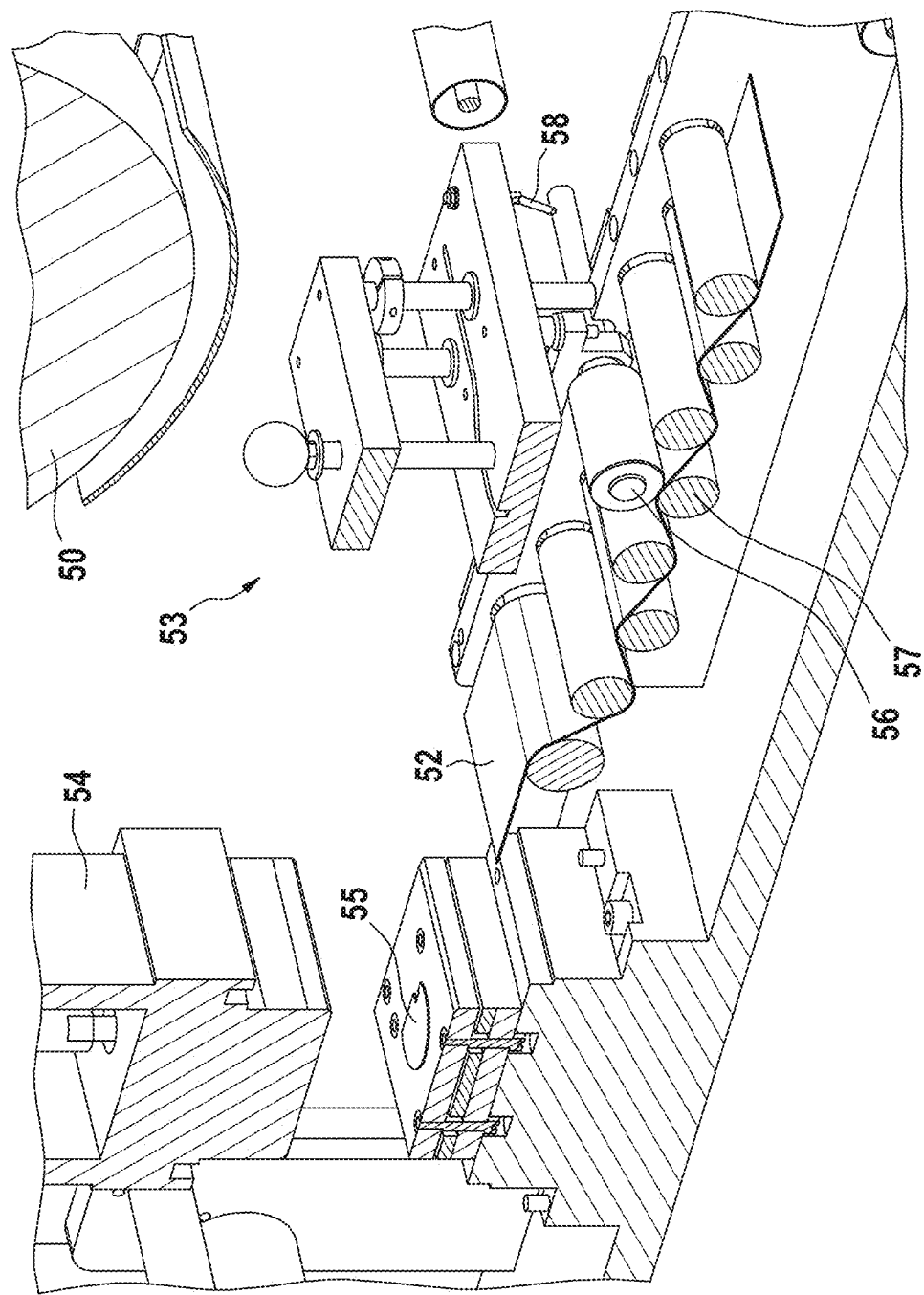
FIG. 9B shows a detail of the paper testing device of FIG. 9A.

The functioning of the impedance measuring appliance 53 will be explained with reference to FIG. 9B. For this purpose, FIG. 9B shows an enlarged view onto the impedance measuring appliance 53 from a backside of the device shown in FIG. 9A. Here, an upper metallic roller 56 and a lower metallic roller 57 can be seen through which the paper strip 52 is fed. A test voltage of 360 V for a 10 μm thin paper is applied between the upper metallic roller 56 and the lower metallic roller 57. If there is a sudden decrease of voltage (or, likewise, a sudden increase in the resulting test current), this is a clear indication for the presence of a metallic particle within the paper strip 52. Then, this section of the paper strip 52 will not be used for die-cutting a paper separator 55 from it. Rather, this section of the paper will pass the die cutter 54 untreated and will be simply wound up by the paper winding roll 51.

If, however, the test voltage did not decrease below a predetermined threshold (or, alternatively, if the test current did not exceed a predetermined threshold), the tested section of the paper strip 52 is considered to be appropriate for die-cutting a paper separator 55 out of it. Thus, the die cutter 54 will then punch out the paper separator 55.

The test voltage is applied to the upper metallic roller 56 by means of a sliding contact 58. The lower metallic role 57 is set to ground.

The other rollers depicted in FIG. 9B serve for giving a sufficiently high tension to the paper strip 52 when being fed through the device.

The device for testing the electric properties of the paper strip 52 enhances the overall quality of the die-cut paper separators 55 and thus serves for less waste of electrolytic capacitors being produced with the help of the tested paper separators 55.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. Method for manufacturing an energy storage of an electrolytic capacitor, comprising the following steps:
    a) placing a first component (1, 2, 3) of an energy storage of an electrolytic capacitor (13) onto a transfer area (5);
    b) optical measuring the first component (1, 2, 3) to determine its actual position;
    c) determine a deviation between the actual position and a desired position;
    d) gripping the first component (1, 2, 3) with a gripper (7);
    e) adjusting the actual position of the first component (1, 2, 3) if a deviation between the actual position and the desired position has been determined;
    f) placing the first component (1,2,3) onto a self-adhesive film at a stacking area (8);
    g) repeating steps a) to e) with a further component (1, 2, 3) of an energy storage, of an electrolytic capacitor (13) and placing the further component (1, 2, 3) onto the first component (1, 2, 3) to form a stack;
    h) fixing the further component (1, 2, 3) on the stack;
    i) repeating steps a) to e) with a further component (1, 2, 3) of an energy storage of an electrolytic capacitor (13) and placing the further component (1, 2, 3) onto a topmost component (1, 2, 3) of the stack to enlarge the stack;
    j) fixing the further component (1, 2, 3) on the stack;
    k) repeating steps i) and j) a plurality of times yielding a completed stack;
    l) fixing the completed stack after the last further component (1, 2, 3) has been placed on the completed stack by wrapping the self-adhesive film around at least a section of the completed stack.

2. Method according to claim 1, characterized in that steps a) to l) are automated executed.

* * * * *